US010614588B2

(12) United States Patent
Chandrasekar et al.

(10) Patent No.: US 10,614,588 B2
(45) Date of Patent: *Apr. 7, 2020

(54) VEHICLE POSITIONING OR NAVIGATION UTILIZING ASSOCIATED FEATURE PAIRS

(71) Applicant: Crown Equipment Corporation, New Bremen, OH (US)

(72) Inventors: Kashyap Chandrasekar, Auckland (NZ); Ryan Estep, Christchurch (NZ); Jacob Thomson, Auckland (NZ); Lucas Waltz, Auckland (NZ)

(73) Assignee: CROWN EQUIPMENT CORPORATION, New Bremen, OH (US)

(*) Notice: Subject to any disclaimer, the term of this patent is extended or adjusted under 35 U.S.C. 154(b) by 41 days.

This patent is subject to a terminal disclaimer.

(21) Appl. No.: 15/964,192

(22) Filed: Apr. 27, 2018

(65) Prior Publication Data
US 2018/0247428 A1 Aug. 30, 2018

Related U.S. Application Data

(63) Continuation of application No. 14/751,375, filed on Jun. 26, 2015, now Pat. No. 9,984,467.

(51) Int. Cl.
G06T 7/70 (2017.01)
G06F 16/51 (2019.01)
(Continued)

(52) U.S. Cl.
CPC ............ G06T 7/70 (2017.01); B60R 1/00 (2013.01); G01B 11/14 (2013.01); G01C 21/206 (2013.01);
(Continued)

(58) Field of Classification Search
CPC ...... B60W 20/10; B60W 20/19; B60W 10/06; B60W 10/08; B60W 2510/0628;
(Continued)

(56) References Cited

U.S. PATENT DOCUMENTS 5,155,684 A 10/1992 Burke et al.
6,732,826 B2 5/2004 Song et al.
(Continued)

FOREIGN PATENT DOCUMENTS

DE 1429016 A1 2/1996
EP 2058720 A2 5/2009
(Continued)

OTHER PUBLICATIONS

Examination Report dated Feb. 12, 2019 relating to Australian Patent Application No. 2015280776.
(Continued)

Primary Examiner — Anthony R Jimenez
(74) Attorney, Agent, or Firm — Dinsmore & Shohl LLP

(57) ABSTRACT

A method for vehicle positioning or navigation utilizing associated feature pairs may include creating a plurality of associated feature pairs by retrieving an initial set of camera data from the camera comprising two-dimensional UV space information, forming pairs from the UV space information, and associating each pair from the UV space information with pairs from each of the plurality of three-dimensional global feature points of the industrial facility map, calculating a best estimate poses from calculated vehicle poses of the associated feature pairs, using an accumulated odometry to update the best estimate pose to a current localized position and setting a seed position as the current localized position. The navigation of the materials handling vehicle is tracked and/or navigated along the inventory transit surface
(Continued)

navigate in at least a partially automated manner utilizing the current localized position.

20 Claims, 14 Drawing Sheets

Related U.S. Application Data

(60) Provisional application No. 62/018,094, filed on Jun. 27, 2014.

(51) Int. Cl.
   G06K 9/00      (2006.01)
   G05D 1/02      (2020.01)
   B60R 1/00      (2006.01)
   G01B 11/14     (2006.01)
   G01C 21/20     (2006.01)
   G05D 1/00      (2006.01)
   G06K 9/52      (2006.01)
   G06T 7/00      (2017.01)
   G06T 17/05     (2011.01)
   G06T 7/73      (2017.01)

(52) U.S. Cl.
   CPC ......... *G05D 1/0088* (2013.01); *G05D 1/0246* (2013.01); *G05D 1/0272* (2013.01); *G06F 16/51* (2019.01); *G06K 9/00476* (2013.01); *G06K 9/00664* (2013.01); *G06K 9/00791* (2013.01); *G06K 9/52* (2013.01); *G06T 7/0004* (2013.01); *G06T 7/73* (2017.01); *G06T 17/05* (2013.01); *G05D 2201/0216* (2013.01); *G06T 2200/04* (2013.01); *G06T 2207/10016* (2013.01); *G06T 2207/30108* (2013.01); *G06T 2207/30248* (2013.01); *G06T 2207/30252* (2013.01)

(58) Field of Classification Search
   CPC . B60W 2510/0633; B60W 2510/0638; B60W 2510/0671; B60W 2540/10; B60W 2710/0683; B60W 2710/083; B60K 6/26; B60K 2006/268; F02N 11/04; B60Y 2200/92; B02B 37/00; F02D 2200/0406; F02D 2250/18; F02D 2250/21; F02D 2250/24; F02D 41/00; Y02T 10/6286; Y10S 903/906
   USPC ......................................................... 701/22
   See application file for complete search history.

(56) References Cited

U.S. PATENT DOCUMENTS

| | | | |
|---|---|---|---|
| 7,681,796 B2 | 3/2010 | Cato et al. | |
| 9,182,763 B2 | 11/2015 | Park et al. | |
| 9,349,181 B2* | 5/2016 | Chandrasekar | G06K 9/00664 |
| 9,417,071 B2 | 8/2016 | Essati et al. | |
| 2006/0013314 A1 | 1/2006 | Vella et al. | |
| 2006/0133641 A1 | 6/2006 | Shimizu et al. | |
| 2006/0165276 A1 | 7/2006 | Hong et al. | |
| 2007/0008312 A1 | 1/2007 | Zhou et al. | |
| 2008/0042805 A1 | 2/2008 | Morhard et al. | |
| 2009/0000912 A1 | 1/2009 | Battles et al. | |
| 2009/0024251 A1 | 1/2009 | Myeong et al. | |
| 2009/0081008 A1 | 3/2009 | Somin et al. | |
| 2009/0084173 A1 | 4/2009 | Gudat et al. | |
| 2010/0100457 A1 | 4/2010 | Rathod et al. | |
| 2010/0161208 A1 | 6/2010 | Akita et al. | |
| 2011/0153063 A1 | 6/2011 | Wurman et al. | |
| 2011/0295411 A1 | 12/2011 | Rotella et al. | |
| 2011/0295412 A1 | 12/2011 | Hara et al. | |
| 2012/0123614 A1 | 5/2012 | Laws et al. | |
| 2013/0147790 A1 | 6/2013 | Hildreth et al. | |
| 2014/0032035 A1 | 1/2014 | Thomson | |
| 2014/0058612 A1 | 2/2014 | Wong et al. | |
| 2014/0058634 A1 | 2/2014 | Wong et al. | |
| 2014/0074342 A1 | 3/2014 | Wong et al. | |
| 2014/0207781 A1 | 7/2014 | Quack | |
| 2014/0214258 A1 | 7/2014 | Wong et al. | |
| 2014/0247963 A1 | 9/2014 | Lin et al. | |
| 2014/0303773 A1 | 10/2014 | Wurman et al. | |
| 2014/0364998 A1 | 12/2014 | Neiser et al. | |
| 2015/0120125 A1 | 4/2015 | Thomson et al. | |
| 2015/0142168 A1 | 5/2015 | Holland et al. | |
| 2015/0149050 A1 | 5/2015 | Palsgaard et al. | |
| 2015/0250137 A1 | 9/2015 | Palsgaard et al. | |
| 2016/0178728 A1 | 6/2016 | Liu | |
| 2016/0350904 A1 | 12/2016 | Zhang et al. | |

FOREIGN PATENT DOCUMENTS

| | | |
|---|---|---|
| WO | 2010006352 A1 | 1/2010 |
| WO | 2012040644 A1 | 3/2012 |

OTHER PUBLICATIONS

Chinese Office Action dated Nov. 8, 2018 pertaining to Application No. 201580034506.7.

International Search Report and Written Opinion dated Feb. 18, 2016 for PCT Application No. PCT/NZ2015/050078 filed Jun. 25, 2015 entitled "Lost Vehicle Recovery Utilizing Associated Feature Pairs".

International Search Report and Written Opinion dated Feb. 18, 2016 for PCT Application No. PCT/NZ2015/050079 filed Jun. 25, 2015 entitled "VehiclePositioning or Navigation Utilizing Associated Feature Pairs".

Chinese Office Action relating to Chinese Patent Application No. 2015800234489.7 dated Sep. 18, 2017.

* cited by examiner

VEHICLE POSITIONING OR NAVIGATION UTILIZING ASSOCIATED FEATURE PAIRS

CROSS-REFERENCE TO RELATED APPLICATIONS

This application is a continuation application of U.S. patent application Ser. No. 14/751,375 filed Jun. 26, 2015, which claims the benefit of U.S. Provisional Application No. 62/018,094 filed Jun. 27, 2014, the entireties of which are incorporated by reference herein.

TECHNICAL FIELD

The present specification generally relates to systems and methods for providing global localization for industrial vehicles based on features of ceiling lights and, more specifically, to systems and methods for utilization of a global localization to analyze unique constellations or patterns of ceiling lights in a warehouse to track the location of an industrial vehicle with a known or unknown location.

BACKGROUND

In order to move items about an industrial environment, workers often utilize industrial vehicles, including for example, forklift trucks, hand and motor driven pallet trucks, and/or other materials handling vehicles. The industrial vehicles can be configured as an automated guided vehicle or a manually guided vehicle that navigates through the environment. In order to facilitate automated guidance, navigation, or both, the industrial vehicle may be adapted for localization within the environment. That is the industrial vehicle can be adapted with sensors and processors for determining the location of the industrial vehicle within the environment such as, for example, pose and position of the industrial vehicle. The sensors can be configured to detect objects in the environment and the localization can be dependent upon features extracted from such detected objects.

SUMMARY

In one embodiment, materials handling vehicle may include a camera, one or more vehicular processors, a drive mechanism configured to move the materials handling vehicle along an inventory transit surface, a materials handling mechanism configured to store and retrieve goods in a storage bay of an industrial facility, and vehicle control architecture in communication with the drive and materials handling mechanisms. The camera may be communicatively coupled to the one or more vehicular processors and captures an input image of overhead features. An industrial facility map may include a plurality of three-dimensional global feature points associated with a mapping of the overhead features. The one or more vehicular processors of the materials handling vehicle may execute vehicle functions to create a plurality of associated feature pairs by retrieving a set of camera data from the camera comprising two-dimensional UV space information, forming pairs from the UV space information, and mapping pairs from the UV space information with pairs from the plurality of three-dimensional global feature points of the industrial facility map, and calculate respective vehicle poses for associated feature pairs within a visual range of the camera. The one or more vehicular processors of the materials handling vehicle may further execute vehicle functions to calculate a best estimate pose of the materials handling vehicle based on a highest-ranked pair of the plurality of associated feature pairs, wherein the highest-ranked pair comprises a smallest pose sum error of the plurality of associated feature pairs, and navigate the materials handling vehicle utilizing the best estimate pose.

In another embodiment, a system may include a materials handling vehicle and a management server. The materials handling vehicle may include a camera, one or more vehicular processors, a drive mechanism configured to move the materials handling vehicle along an inventory transit surface, a materials handling mechanism configured to store and retrieve goods in a storage bay of an industrial facility, and vehicle control architecture in communication with the drive and materials handling mechanisms. The camera may be communicatively coupled to the one or more vehicular processors and the management server and may capture an input image of overhead features. The one or more vehicular processors may be communicatively coupled to the management server. An industrial facility map may be stored on the management server and may be communicatively coupled to the one or more vehicular processors, wherein the industrial facility map comprises a plurality of three-dimensional global feature points associated with a mapping of the overhead features. The one or more vehicular processors of the materials handling vehicle may execute vehicle functions to create a plurality of associated feature pairs by retrieving a set of camera data from the camera comprising two-dimensional UV space information, forming pairs from the UV space information, and mapping pairs from the UV space information with pairs from the plurality of three-dimensional global feature points of the industrial facility map. The one or more vehicular processors of the materials handling vehicle may further execute vehicle functions to calculate respective vehicle poses for associated feature pairs within a visual range of the camera; calculate a best estimate pose of the materials handling vehicle from the calculated vehicle poses based on a highest-ranked pair of the plurality of associated feature pairs, wherein the highest-ranked pair comprises a smallest pose sum error of the plurality of associated feature pairs; and navigate the materials handling vehicle utilizing the best estimate pose.

In embodiments, the vehicular processor(s) may further execute vehicle functions to validate the current localized position prior to updating the seed position as the current localized position. Such validation may include functions to record the number of unique global feature points after each data association step until the number is above a threshold such that the seed position as the current localized position is validated.

In embodiments, the vehicular processor(s) may further execute vehicle functions to publish the seed position as the current localized position on a display after updating the seed position as the current localized position.

In embodiments, the vehicular processor(s) may further execute vehicle functions to determine if the materials handling vehicle is lost and, if the materials handling vehicle is determined to be lost, retrieve a subsequent set of camera data from the camera and repeat, with the subsequent set of camera data from the camera in place of the initial set of camera data from the camera until the materials handling vehicle is found, functions to (i) create a plurality of associated feature pairs by retrieving the subsequent set of camera data from the camera comprising two-dimensional UV space information, forming pairs from the UV space information, and associating pairs from the UV space information with pairs from the plurality of three-dimensional global feature points of the industrial facility map; (ii) calculate a vehicle pose for associated feature pairs within a visual range of the camera; (iii) calculate a best estimate pose of the materials handling vehicle based on a highest-rated pair of the plurality of associated feature pairs; (iv) use an accumulated odometry associated with the materials handling vehicle to update the best estimate pose to a current localized position; (v) set a seed position as the current localized position; and track the navigation of the materials handling vehicle along the inventory transit surface, navigate the materials handling vehicle along the inventory transit surface in at least a partially automated manner, or both, utilizing the current localized position.

In embodiments, the determination of whether the materials handling vehicle is lost may be based at least in part on whether the seed position comprises incorrect data. In embodiments, the determination of whether the materials handling vehicle is lost may be based at least in part on whether the camera data is insufficient to correct for an error associated with the accumulated odometry. In embodiments, the plurality of associated feature pairs are created by data association steps that may include creating UV space information pairs; associating each global feature point with a first UV space feature in each UV space information pair; and associating each global feature point within a maximum visual range of the camera with a second UV space feature in each UV space information pair.

In embodiments, the calculation of a vehicle pose for each associated feature pair within a visual range of the camera may be based at least in part on use of a global localization algorithm. The global localization algorithm may include a formula to calculate a yaw of the vehicle about a first UV space feature of an associated feature pair that may be an anchored feature. The formula may include that N is a cross product of two 3D vectors; T is a target 3D point for yaw rotation;

$$D = \sqrt{N_x^2 * N_y^2}\,;\ Y_{offset} = 2*\tan^{-1}\left(\frac{N_x}{\sqrt{N_x^2+N_y^2}+N_y}\right);\ \text{and}$$

$$Y = \begin{cases} \text{undefined, if } N_z \neq 0,\ \text{and } \left|\frac{T_z}{\sqrt{T_x^2+T_y^2}}\right| > \left|\frac{D}{N_z}\right|, \\ \quad \text{and } D*T_x - N_z*T_z = 0 \\ -Y_{offset},\ \text{if } \left\|\frac{T_x}{T_y}\right| - \left|\frac{N_z}{D}\right\| < 0.001\ \text{and}\ T_y > 0 \\ \pi - Y_{offset},\ \text{if } \left\|\frac{T_x}{T_y}\right| - \left|\frac{N_z}{D}\right\| < 0.001\ \text{and}\ T_y < 0 \\ 2*\tan^{-1}\left(\frac{\frac{D*T_y}{D*T_x - N_z*T_z} - }{\sqrt{D^2*(T_x^2+T_y^2) - N_z^2*T_z^2}}\right) - Y_{offset},\ \text{otherwise} \end{cases}$$

In embodiments, the calculation of a best estimate pose of the materials handling vehicle based on a highest-rated pair of the plurality of associated feature pairs may be based at least in part on a calculation of a pose sum error for each calculated vehicle pose wherein the highest-rated pair has the lowest pose sum error.

In yet another embodiment, a method of navigating or tracking the navigation of a materials handling vehicle along an inventory transit surface may include disposing a materials handling vehicle upon an inventory transit surface of an industrial facility, wherein the materials handling vehicle is in communication with a management server, wherein the materials handling vehicle comprises a camera, one or more vehicular processors, a drive mechanism configured to move the materials handling vehicle along the inventory transit surface, a materials handling mechanism configured to store and retrieve goods in a storage bay of the industrial facility, and vehicle control architecture in communication with the drive and materials handling mechanisms. The method may further include utilizing the drive mechanism to move the materials handling vehicle along the inventory transit surface; capturing an input image of overhead features of the industrial facility via the camera as the materials handling vehicle moves along the inventory transit surface; providing an industrial facility map comprising a plurality of three-dimensional global feature points associated with a mapping of the overhead features; and creating a plurality of associated feature pairs by retrieving a set of camera data from the camera comprising two-dimensional UV space information, forming pairs from the UV space information, and mapping pairs from the UV space information with pairs from the plurality of three-dimensional global feature points of the industrial facility map. The method may further include via the one or more vehicular processors, calculating respective vehicle poses for associated feature pairs within a visual range of the camera; via the one or more vehicular processors, calculating a best estimate pose of the materials handling vehicle from the calculated vehicle poses based on a highest-ranked pair of the plurality of associated feature pairs, wherein the highest-ranked pair comprises a smallest pose sum error of the plurality of associated feature pairs; and navigating the materials handling vehicle utilizing the best estimate pose.

In embodiments, the method may further include validating the current localized position prior to updating the seed position as the current localized position. The validation may include recording the number of unique global feature points after each data association step until the number is above a threshold such that the seed position as the current localized position is validated. In embodiments, the method may further include publishing the seed position as the current localized position on a display after updating the seed position as the current localized position.

In embodiments, the method may further include determining whether the materials handling vehicle is lost; if the materials handling vehicle is determined to be lost, finding the materials handling vehicle by retrieving a subsequent set of camera data from the camera comprising two-dimensional UV space information, forming pairs from the UV space information, and associating each pair from the UV space information with pairs from each of the plurality of three-dimensional global feature points of the industrial facility map to create a plurality of new associated feature pairs; via the vehicular processor(s), calculating a vehicle pose for each new associated feature pair within a visual range of the camera; via the vehicular processor(s), calculating a new best estimate pose of the materials handling vehicle based on a highest-rated pair of the plurality of new associated feature pairs; using an accumulated odometry associated with the materials handling vehicle to update the new best estimate pose to a new current localized position; and setting the seed position as the new current localized position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments described herein generally relate to localization techniques for extracting features from overhead lighting including, but not limited to, skylights. The Localization is a phrase that is utilized herein to refer to any of a variety of system configurations that enable active tracking of a vehicle location in a warehouse, industrial facility, or other environment. The concepts of the present disclosure are not limited to any particular localization system configuration and are deemed to be applicable to any of a variety of conventional and yet-to-be developed localization systems. As will be described in greater detail further below, a localization system may be used alongside a global localization method (GLM) and/or validation system such that, if an industrial vehicle is lost through the localization system method, the GLM may be utilized to recover the vehicle, and the validation system may be utilized to check the accuracy of the recovery before publishing a new current vehicle location. Additionally or alternatively, the GLM may utilized as a localization system itself as well as a recovery system, and/or the validation system may be used with the localization systems and/or the GLM systems.

The localization systems may be used to localize and/or navigate an industrial vehicle through a building structure, such as a warehouse. Suitably, the overhead lighting may be mounted in or on a ceiling of a building. However, in some embodiments the lighting may also or alternatively be suspended from a ceiling or wall via suitable structure. In some embodiments, a camera can be mounted to an industrial vehicle (e.g., automated guided vehicle or a manually guided vehicle) that navigates through a warehouse. The input image can be any image captured from the camera prior to extracting features from the image.

Figure 1:
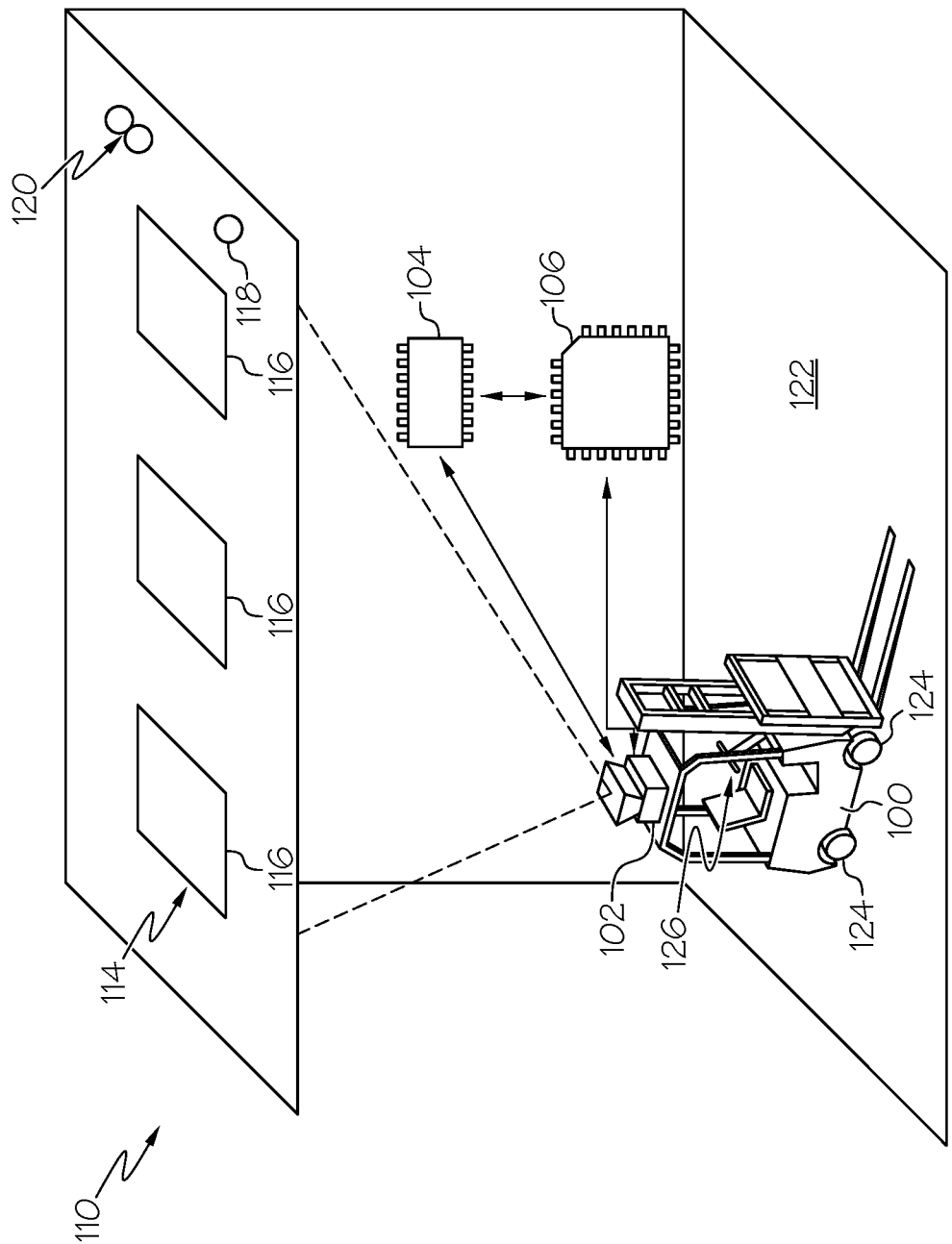
FIG. 1 depicts a vehicle for localization according to one or more embodiments shown and described herein.

Referring now to FIG. 1, a vehicle 100 can be configured to navigate through an industrial facility such as a warehouse 110. The vehicle 100 can comprise a materials handling vehicle including a drive mechanism to move the materials handling vehicle along an inventory transit surface, a materials handling mechanism configured to store and retrieve goods in a storage bay of an industrial facility, and vehicle control architecture in communication with the drive and materials handling mechanisms. The vehicle 100 can comprise an industrial vehicle for lifting and moving a payload such as, for example, a forklift truck, a reach truck, a turret truck, a walkie stacker truck, a tow tractor, a pallet truck, a high/low, a stacker-truck, trailer loader, a sideloader, a fork hoist, or the like. The industrial vehicle can be configured to automatically or manually navigate an inventory transit surface such as a surface 122 of the warehouse 110 along a desired path. Accordingly, the vehicle 100 can be directed forwards and backwards by rotation of one or more wheels 124. Additionally, the vehicle 100 can be caused to change direction by steering the one or more wheels 124. Optionally, the vehicle can comprise operator controls 126 for controlling functions of the vehicle such as, but not limited to, the speed of the wheels 124, the orientation of the wheels 124, or the like. The operator controls 126 can comprise controls that are assigned to functions of the vehicle 100 such as, for example, switches, buttons, levers, handles, pedals, input/output device, or the like. It is noted that the term "navigate" as used herein can mean controlling the movement of a vehicle from one place to another.

The vehicle 100 can further comprise a camera 102 for capturing overhead images such as input images of overhead features. The camera 102 can be any device capable of capturing the visual appearance of an object and transforming the visual appearance into an image. Accordingly, the camera 102 can comprise an image sensor such as, for example, a charge coupled device, complementary metal-oxide-semiconductor sensor, or functional equivalents thereof. In some embodiments, the vehicle 100 can be located within the warehouse 110 and be configured to capture overhead images of the ceiling 112 of the warehouse 110. In order to capture overhead images, the camera 102 can be mounted to the vehicle 100 and focused to the ceiling 112. For the purpose of defining and describing the present disclosure, the term "image" as used herein can mean a representation of the appearance of a detected object. The image can be provided in a variety of machine readable representations such as, for example, JPEG, JPEG 2000, Exif, TIFF, raw image formats, GIF, BMP, PNG, Netpbm format, WEBP, raster formats, vector formats, or any other format suitable for capturing overhead objects.

The ceiling 112 of the warehouse 110 can comprise overhead lights such as, but not limited to, ceiling lights 114 for providing illumination from the ceiling 112 or generally from above a vehicle operating in the warehouse. The ceiling lights 114 can comprise substantially rectangular lights such as, for example, skylights 116, fluorescent lights, or the like; and may be mounted in or suspended from the ceiling or wall structures so as to provide illumination from above. As used herein, the term "skylight" can mean an aperture in a ceiling or roof fitted with a substantially light transmissive medium for admitting daylight, such as, for example, air, glass, plastic or the like. While skylights can come in a variety of shapes and sizes, the skylights described herein can include "standard" long, substantially rectangular skylights that may or may not be split by girders or crossbars into a series of panels. Alternatively, skylights can comprise smaller, discrete skylights of rectangular or circular shape that are similar in size to a bedroom window, i.e., about 30 inches by about 60 inches (about 73 cm by about 146 cm). Alternatively or additionally, the ceiling lights 114 can comprise substantially circular lights such as, for example, round lights 118, merged lights 120, which can comprise a plurality of adjacent round lights that appear to be a single object, or the like. Thus, overhead lights or 'ceiling lights' include sources of natural (e.g. sunlight) and artificial (e.g. electrically powered) light.

The embodiments described herein can comprise one or more vehicular processors such as processors 104 communicatively coupled to the camera 102. The one or more processors 104 can execute machine readable instructions to implement any of the methods or functions described herein automatically. Memory 106 for storing machine readable instructions can be communicatively coupled to the one or more processors 104, the camera 102, or any combination thereof. The one or more processors 104 can comprise a processor, an integrated circuit, a microchip, a computer, or any other computing device capable of executing machine readable instructions or that has been configured to execute functions in a manner analogous to machine readable instructions. The memory 106 can comprise RAM, ROM, a flash memory, a hard drive, or any non-transitory device capable of storing machine readable instructions.

The one or more processors 104 and the memory 106 may be integral with the camera 102. Alternatively or additionally, each of the one or more processors 104 and the memory 106 can be integral with the vehicle 100. Moreover, each of the one or more processors 104 and the memory 106 can be separated from the vehicle 100 and the camera 102. For example, a management server, server, or a mobile computing device can comprise the one or more processors 104, the memory 106, or both. It is noted that the one or more processors 104, the memory 106, and the camera 102 may be discrete components communicatively coupled with one another without departing from the scope of the present disclosure. Accordingly, in some embodiments, components of the one or more processors 104, components of the memory 106, and components of the camera 102 can be physically separated from one another. The phrase "communicatively coupled," as used herein, means that components are capable of exchanging data signals with one another such as, for example, electrical signals via conductive medium, electromagnetic signals via air, optical signals via optical waveguides, or the like.

Thus, embodiments of the present disclosure may comprise logic or an algorithm written in any programming language of any generation (e.g., 1GL, 2GL, 3GL, 4GL, or 5GL). The logic or an algorithm can be written as machine language that may be directly executed by the processor, or assembly language, object-oriented programming (OOP), scripting languages, microcode, etc., that may be compiled or assembled into machine readable instructions and stored on a machine readable medium. Alternatively or additionally, the logic or algorithm may be written in a hardware description language (HDL). Further, the logic or algorithm can be implemented via either a field-programmable gate array (FPGA) configuration or an application-specific integrated circuit (ASIC), or their equivalents.

As is noted above, the vehicle 100 can comprise or be communicatively coupled with the one or more processors 104. Accordingly, the one or more processors 104 can execute machine readable instructions to operate or replace the function of the operator controls 126. The machine readable instructions can be stored upon the memory 106. Accordingly, in some embodiments, the vehicle 100 can be navigated automatically by the one or more processors 104 executing the machine readable instructions. In some embodiments, the location of the vehicle can be monitored by the localization system as the vehicle 100 is navigated.

For example, the vehicle 100 can automatically navigate along the surface 122 of the warehouse 110 along a desired path to a desired position based upon a localized position of the vehicle 100. In some embodiments, the vehicle 100 can determine the localized position of the vehicle 100 with respect to the warehouse 110. The determination of the localized position of the vehicle 100 can be performed by comparing image data to map data. The map data can be stored locally in the memory 106, which can be updated periodically, or map data provided by a server or the like. In embodiments, an industrial facility map comprises a plurality of three-dimensional global feature points associated with a mapping of the overhead features. Given the localized position and the desired position, a travel path can be determined for the vehicle 100. Once the travel path is known, the vehicle 100 can travel along the travel path to navigate the surface 122 of the warehouse 110. Specifically, the one or more processors 106 can execute machine readable instructions to perform localization system functions and operate the vehicle 100. In one embodiment, the one or more processors 106 can adjust the steering of the wheels 124 and control the throttle to cause the vehicle 100 to navigate the surface 122.

Figure 2:
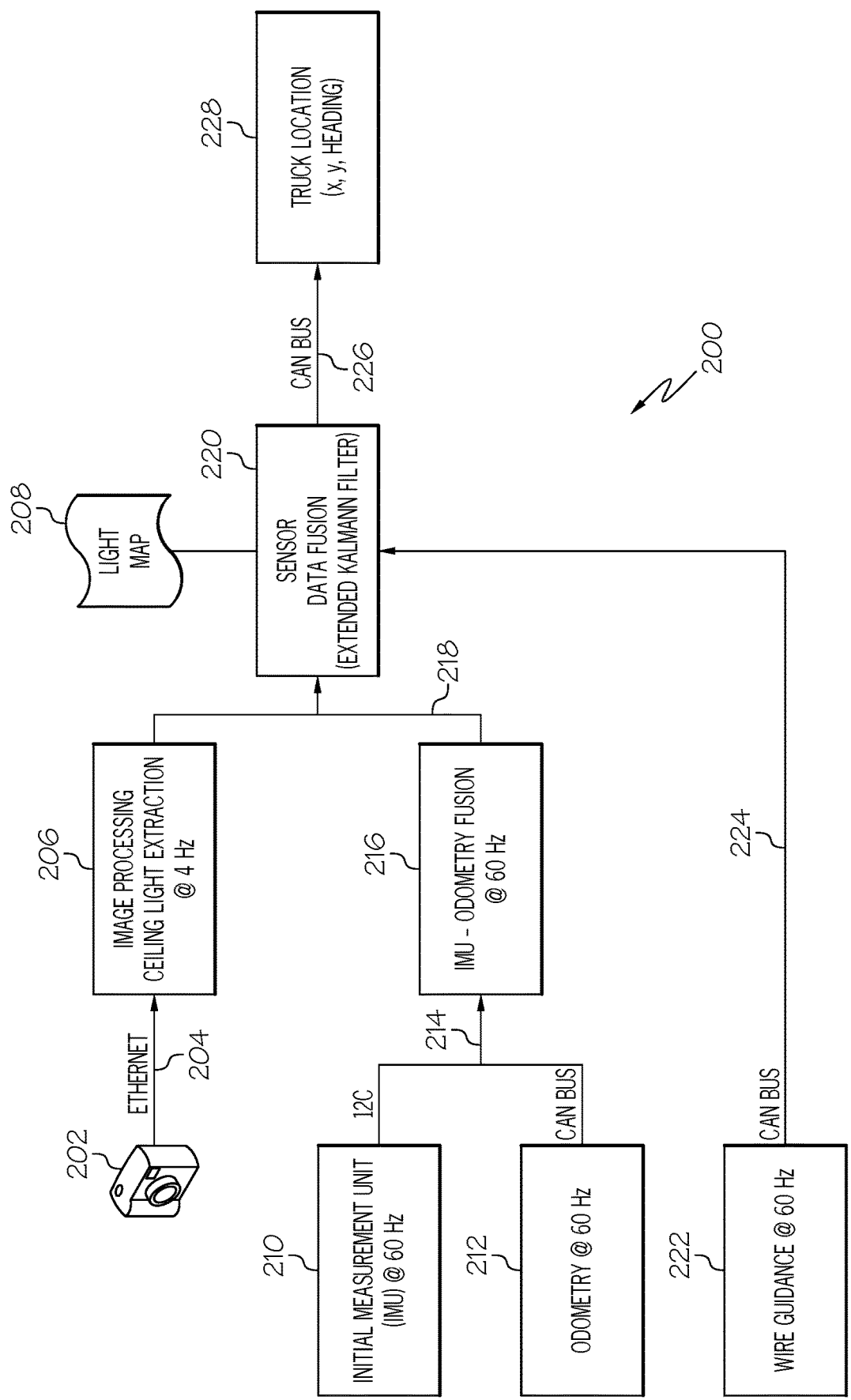
FIG. 2 depicts a block diagram illustrating an exemplary localization system according to one or more embodiments shown and described herein.

Referring now to FIG. 2, a flow chart of a sequence of functions for a localization system incorporating a feature extraction algorithm along with odometry fusion is schematically depicted. It is noted that, while the functions are enumerated and depicted as being performed in a particular sequence in the depicted embodiment, the functions can be performed in an alternative order without departing from the scope of the present disclosure. It is furthermore noted that one or more of the functions can be omitted without departing from the scope of the embodiments described herein.

For illustrative purposes, an example of a utilized localization system 200 is further illustrated in the block diagram found in FIG. 2 of a localization system, which forms an integral part of the present disclosure. The illustrated system operates by starting from a known position (i.e., a seed) in the warehouse and dead reckoning with fused odometry. To correct for an error associated with dead reckoning, a camera looking at the ceiling will match mapped features and use the independent data to provide corrective feedback. For example, system 200 includes camera 202 that is connected along communication coupling systems such as Ethernet 204 to an image processing ceiling light extraction system 206. As an example and not a limitation, the image processing ceiling light extraction system 206 may operate at 4 Hz and may utilize an algorithm to extract features such as two-dimensional UV-space points or images from overhead features or lights. System 200 further includes an initial measurement unit (IMU) 210 operating at 60 Hz, for example, associated with the vehicle 100 that interacts with odometry 212 of the vehicle 100 that operates at 60 Hz to combine along path 214 to form an IMU-Odometry Fusion 216 operating at 60 Hz. The IMU-Odometry Fusion 216 combines along path 218 with the image processing ceiling light extraction 206 to create a sensor data fusion 220 that is placed through an extended kalmann filter, for example. A light map 208 combines with the sensor data fusion 220 and a wire guidance 222 operating at 60 Hz, for example, to travel along can bus path 226 and determine a truck location 228 including pose data such as an x coordinate, y coordinate, and a heading or direction.

Figure 3:
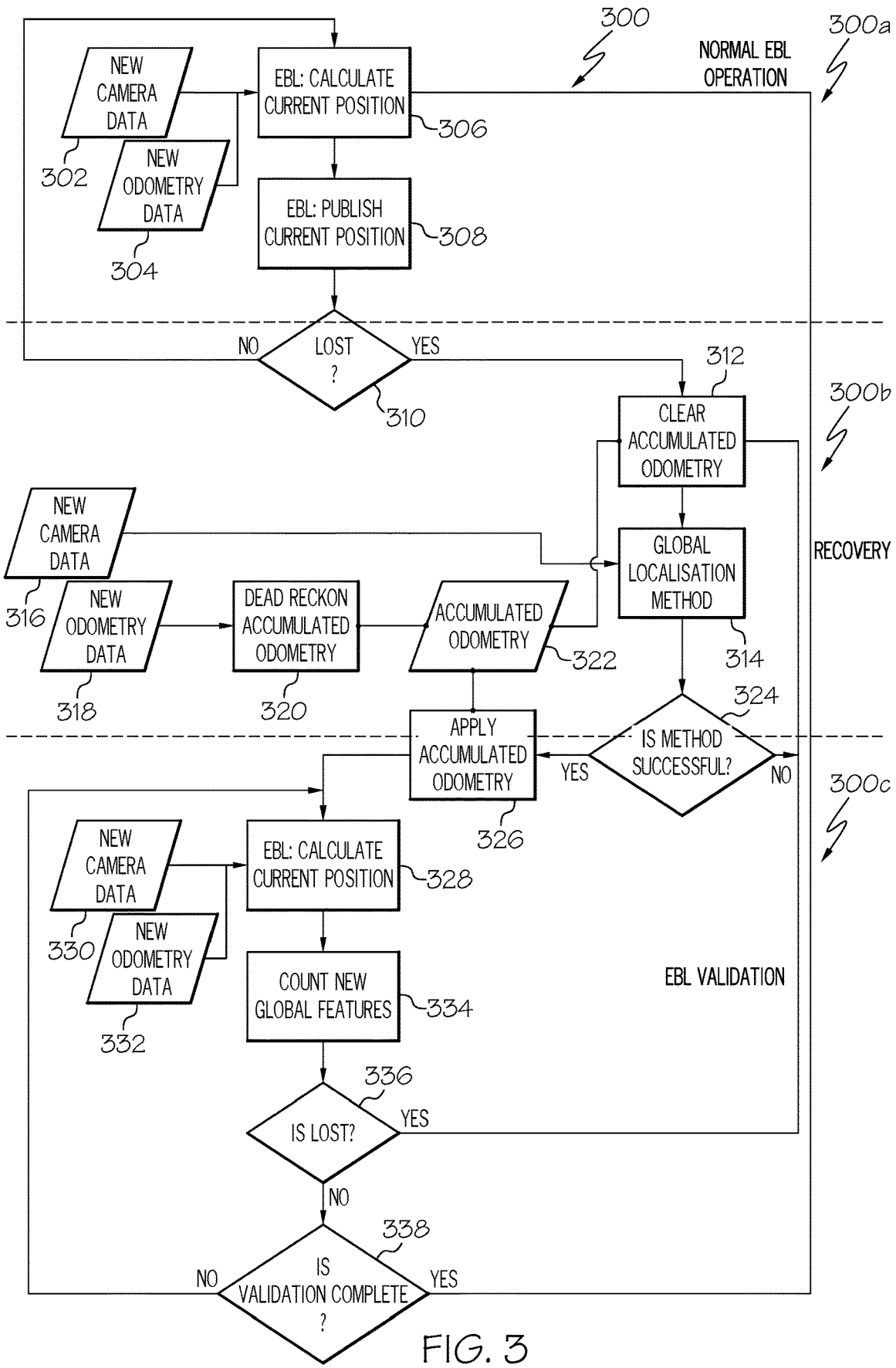
FIG. 3 depicts a flowchart of an exemplary method for camera feature extraction and application and validation of a global localization method within a localization process according to one or more embodiments shown and described herein.

Referring to FIG. 3, a process 300 includes a localization system operation 300*a*, a recovery operation 300*b*, and a validation process 300*c*. The localization system operation 300*a* is shown in which new camera data 302 and new odometry data 304 are combined to calculate a current localization system position in a calculating step 306 of the vehicle 100 and to then publish the current localization system position in a publishing step 308. In embodiments, a localized position of the materials handling vehicle with respect to an inventory transit surface of an industrial facility is determined based on a seed position of the materials handling vehicle in the industrial facility and a dead reckoning associated with the materials handling vehicle. For example, an initial set of camera data from the camera is used and comprises two-dimensional UV space information to provide corrective feedback for the localized position. The localized position is used to track navigation of the materials handling vehicle along the inventory transit surface and/or navigate the materials handling vehicle along the inventory transit surface in at least a partially automated manner.

If the camera data is insufficient to correct the dead reckoning error, or the seed was incorrect to start with; the system becomes lost. Similar challenges are associated with other types of localization systems. In embodiments, the materials handling vehicle is determined to be lost based on whether the industrial facility seed position comprises incorrect data and/or whether the camera data is insufficient to correct for an error associated with the dead reckoning. It is contemplated that a way to return to a localized state will be to re-seed localization from a known start position. For example, a global localization method (GLM), including a algorithm described herein and in greater detail further below, utilizes light constellations or patterns observed by a camera (converted into two-dimensional (2D) UV space coordinates) and a knowledge of mapped global locations of all lights observable within a visual range of the camera (provided in three-dimensional (3D) coordinates) to calculate a location of a truck, even when the truck's location is lost or unknown. Such a GLM works with lights at multiple and differing heights in a warehouse, for example, which conventional methods do not accomplish. In embodiments, the GLM may be used as a standalone localization system that may locate an initial seed position, following similar processes as set forth below with respect to the recovery operation 300*b*.

The illustration of FIG. 3 shows how the GLM is used in localization systems to recover from a lost state. When a utilized localization system becomes lost such that a location of an industrial vehicle is unknown, the GLM begins to run in a separate thread on new camera data. The GLM will associate two-dimensional (2D) UV space information provided by the camera data to three-dimensional (3D) lights in the map shown as global features, and then calculate a global position of the industrial vehicle. For example, a plurality of associated feature pairs are created by retrieving an initial set of camera data from the camera comprising two-dimensional UV space information, forming pairs from the UV space information, and associating each pair from the UV space information with pairs from each of the plurality of three-dimensional global feature points of the industrial facility map. As described in greater detail further below, a vehicle pose for each associated feature pair within a visual range of the camera is calculated, and a best estimate pose of the materials handling vehicle based on a highest-rated pair of the plurality of associated feature pairs is calculated. As described below, an accumulated odometry associated with the materials handling vehicle is used to update the best estimate pose to a current localized position, and a seed position is set as the current localized position. The navigation of the materials handling vehicle is tracked along the inventory transit surface and/or the materials handling vehicle is navigated along the inventory transit surface in at least a partially automated manner utilizing the current localized position.

For example, on the localization system's thread, while the GLM is running, an odometry data for the industrial vehicle is accumulated. When the GLM succeeds, the accumulated odometry is used to update a calculated pose from the GLM to a current position of the industrial vehicle. This industrial vehicle position is used to seed the localization system in a validation state. In the localization system validation state, the localization system will run as normal, but will not publish its current location. When the validation has succeeded by matching a threshold such as certain number of lights in the warehouse, for example, the localization system may begin publishing the current pose.

For example, referring to FIG. 3, after a determination is made in step 310 that the current position is lost, the recovery operation 300b is initiated. The recovery operation 300b includes clearing accumulating odometry in step 312 and applying a global localization method (GLM) in step 314. The application of the GLM includes using new camera data 316 to calculate a current position and determining if the method is successful in step 324. If not, the GLM is applied again until the method is successful. Upon the method being successful, new odometry data 318 is used along with dead reckoning accumulated odometry of step 320 to provide an accumulated odometry 322 that is applied in step 326 with the successful GLM of step 324 to calculate the current localization system position in step 328.

A validation process 300c may then be applied to validate the calculated position of step 328 prior to publishing the position in step 308. For example, new camera data 330 and new odometry data 332 are used to calculate a current localization system positions in step 328 and new global features that are matched are recorded and counted in step 334. If the vehicle 100 becomes lost in step 336, the recovery operation 300b begins again. If the vehicle 100 is not lost and the count of new global features that are matched surpass a threshold, as described in greater detail further below, the validation state is considered complete in step 338 and the localization system exits the validation state to publish location data in step 308. If the validation step is not considered complete in step 338, the validation process 300c continues until the validation step is considered complete.

The present disclosure below describes in greater detail the GLM, including an algorithm and a filtration process, along with a framework and method of gathering an applying an accumulating odometry from a localization system thread (or separate GLM thread utilized as a localization system) to a successful GLM recovery thread. Further, a localization system validation algorithm or method is set forth and described in greater detail.

Figure 4:
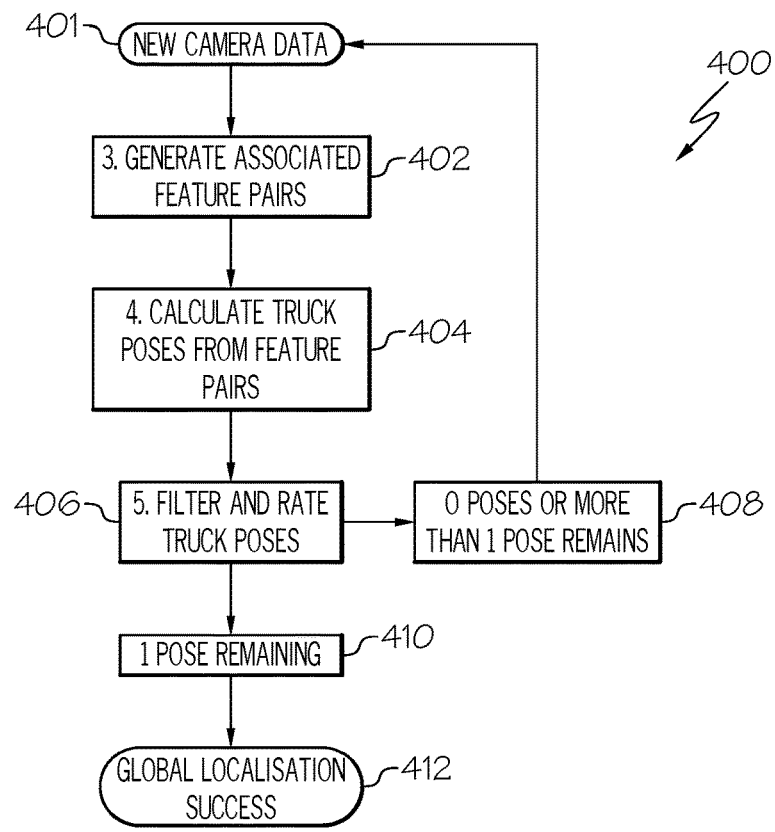
FIG. 4 depicts a flowchart overview of an exemplary method for a global localization method according to one or more embodiments shown and described herein.

Referring to FIG. 4, a flow diagram illustrates an overview of steps in the GLM that determines a location of an industrial vehicle utilizing features observed by a camera in two-dimensional, UV-Space coordinates that are associated to corresponding three-dimensional (3D) coordinates from a range in which the camera is observing and from a global map of the 3D coordinates that represent global feature points. After these associated features are matched, a filtration occurs to providing a rating or ranking to the associated features. A pair of these associated features (such associated features including both a known 2D UV-space coordinate and a global 3D coordinate), which may be a highest ranked pair, for example, is sufficient to determine a global position of a track.

Overall, FIG. 4 shows a GLM overview 400, starting with a step 401 of capturing new camera data. The new camera data provides two-dimensional, UV-Space coordinates that are associated with global 3D coordinates in a camera's visual range to generate, as shown in step 402, possible combinations of associated feature pairs in the industrial facility or warehouse (though all possible combinations of associated features pairs in the industrial facility or warehouse are capable of being generated as well). In step 404, a pose of the industrial vehicle to which this GLM is applied is calculated from each associated feature pair. Each calculated pose is ranked and rated against other calculated poses. For example, in step 406, a sum error at each calculated pose from each associated feature pair is further calculated by a comparison of a predicted camera view to actual camera data of an observed camera view, with a lower sum error indicating a better match between the predicted and observed views. Poses for the industrial vehicles that have a sum error that is higher than a threshold, as set by the system or a user, are deemed to be invalid matches and are filtered out. Such filtration occurs and is repeated through step 408 until a single pose remains in step 410, which then indicates a GLM success in step 412.

Figure 5:
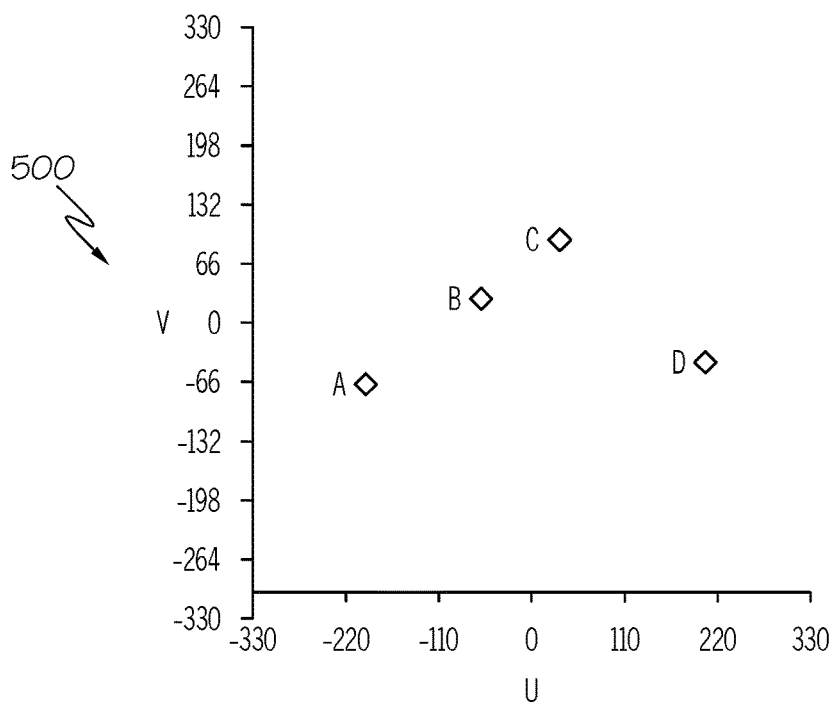
FIG. 5 depicts an exemplary UV image space observation including UV space features A, B, C, and D according to one or more embodiments shown and described herein.
Figure 6:
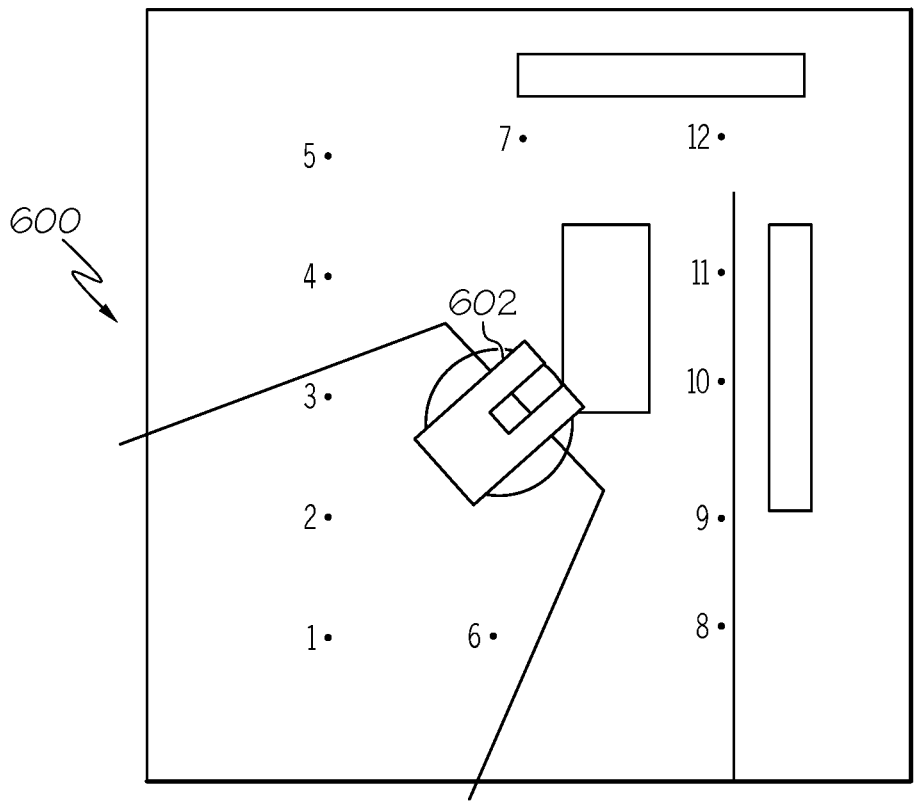
FIG. 6 depicts an exemplary global location plot including global features 1-12 according to one or more embodiments shown and described herein.

With respect to step 402 of FIG. 4, illustrating the generation of possible combinations of associated feature pairs in the industrial facility or warehouse, FIGS. 5-8 provide further detail relating to this step 402. For example, when an industrial vehicles position is unknown or lost, there is not sufficient information to directly match 2D UV-space features, as shown in FIG. 5 below, to global features in a warehouse map, as shown in FIG. 6 below. Thus, every possible combination between a 2D UV-space feature and a pair of 3D global features may be generated to associated feature pairs, and detected incorrect associated feature pairs may be filtered out of the listing or generated associated feature pairs. As simply a pair of associated features is required to compute a pose of an industrial vehicle, the 2D UV space features are grouped into unique pairs to avoid duplication of work. For example, the four features A-D of FIG. 5 are grouped into the following six pairs: AB, AD, AD, BC, BD, and CD.

While the pairs of 2D UV-space features, such as six non-duplicative pairs derivable from the four 2D UV-space features shown in plot 500 of FIG. 5, are to be associated to pairs of global features, such as pairs derived from the 12 global features shown in plot 600 of FIG. 6, it should be understood that the global features that are physically too far apart to be captured in a single camera frame from area 602 and thus outside a view of the camera are not eligible for such association to create associated feature pairs. In embodiments, a pair matching algorithm will determine a first pair of UV-space features, such as A-B, and then associate each global feature to the first UV-space feature in the pair, such as A-B:1 through A-B:12. The second UV-space feature is then associated to each global feature that is within a camera's maximum visual range of the first associated feature. For example, referring to FIGS. 5 and 6, if global features 1, 2, 3, and 6 were within the maximum visual range of UV-space feature A, the pairs with respect to A-B:1 as an example would be A-B:1-2, A-B:1-3, and A-B:1-6. Applying this pair matching algorithm allows for every possible permutation of global features that are observable within the same camera frame to be generated.

Figure 7:
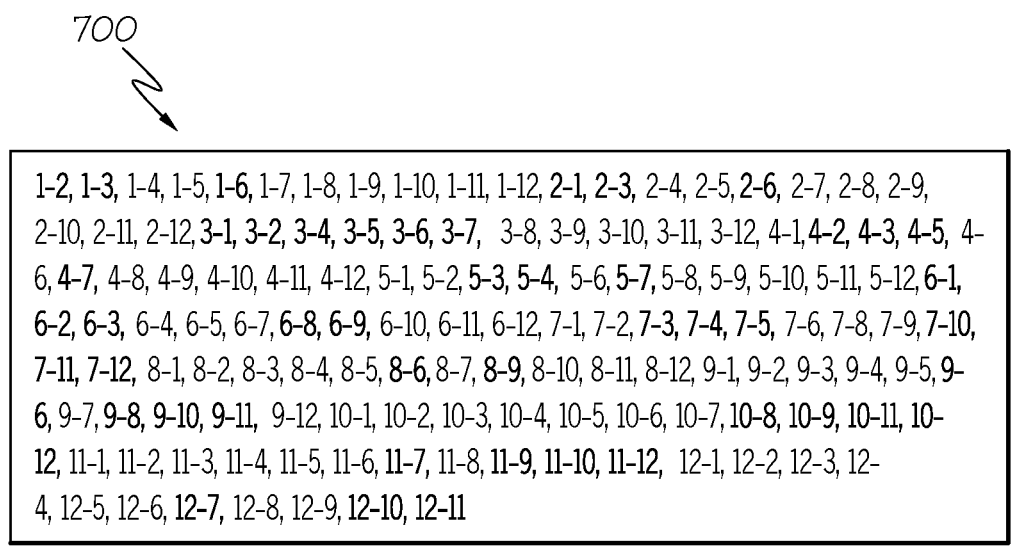
FIG. 7 depicts a listing of all possible global feature pair combinations based on FIG. 6 and according to one or more embodiments shown and described herein.

Referring to FIG. 7, all possible global feature pairs of the 12 global features of FIG. 6 is listed in chart 700. If every possible associated feature pair is created from these listed pairs, the formula shown below in equation 1 would result in 792 associated feature pairs.

$$\text{As for } k \text{ permutations of } n, n^k = \frac{n!}{(n-k)!}, \quad \text{EQUATION 1}$$

the equation for all possible non-duplicative associated $$\text{feature pairs is } \frac{4!}{2!(4-2)!} \text{ observed } UV \text{ pairs} *$$

$$\frac{12!}{(12-2)!} \text{ global pairs} = 792 \text{ associated feature pairs.}$$

In embodiments, an algorithm to reduce the number of analyzed global feature pairs may be used to select only those global features that could be seen in a camera's field of view or visual range. For example, FIG. 7 shows visual range pairs in bold print that are within a visual range of a camera. Should equation 1 be applied to the bold print items in FIG. 7, the equation would result in 6 (observed pairs)*45 (bold print global pairs)=270 associated feature pairs. Referring again to FIG. 6, a visual range from area 802 is schematically depicted in plot 800 FIG. 8 as an area within a dashed circular line 804. Pairs are created between a central global feature point and all other global feature points within the visibility range of the dashed circular line. The bolded visual range pairs are selected as global feature pairs to analyze, and the Equation 1 is applied to generate the following result:

$$\frac{4!}{2!(4-2)!} \text{ observed } UV \text{ pairs} * \frac{6!}{(6-2)!} \text{ global pairs} = \quad \text{EQUATION 2}$$

180 associated feature pairs.

Figure 8:
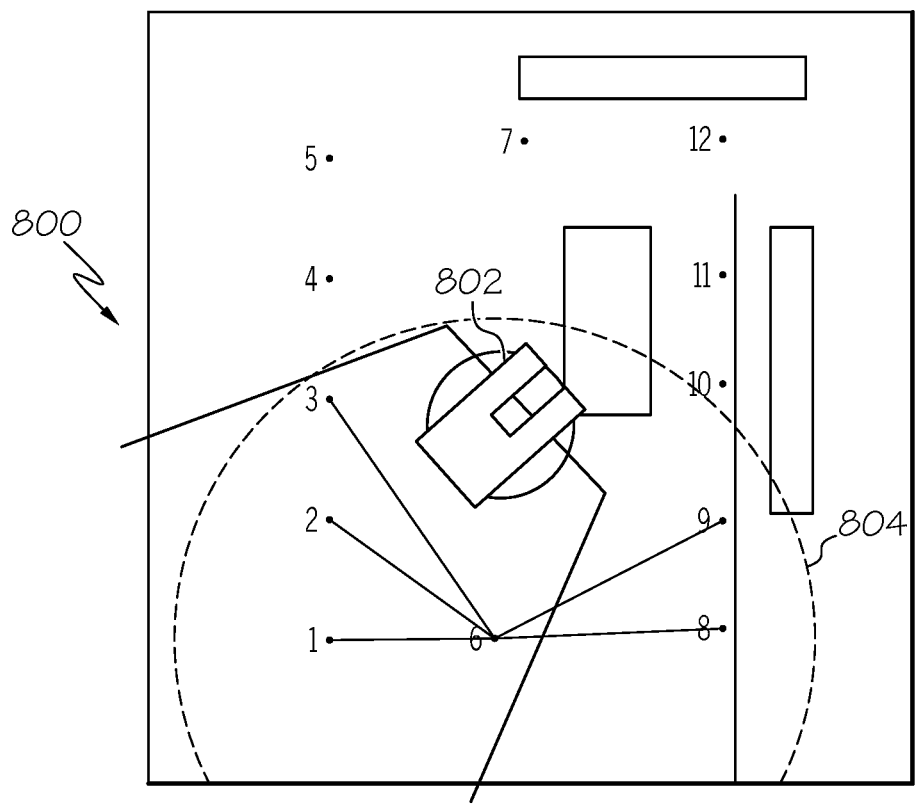
FIG. 8 depicts an exemplary global location plot including global features 1-12 and a maximum range or field of view of a camera according to one or more embodiments shown and described herein.

Thus, instead of analyze a total number of 792 associated feature pairs, this number is reduced to an analysis of 180 associated feature pairs when only analyzing those associated feature pairs within the visual range of the camera of FIG. 8.

Figure 9:
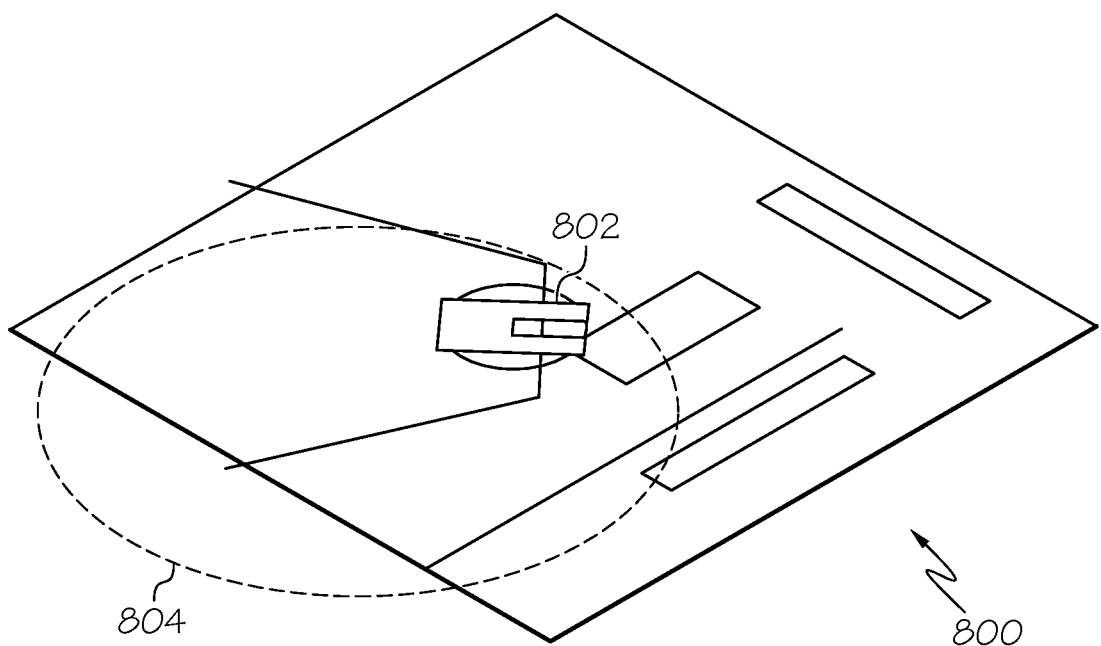
FIG. 9 depicts an exemplary vehicle path plot including a circular path around a global feature that includes all possible vehicle positions and poses that match UV-space observations as shown in FIG. 5 according to one or more embodiments shown and described herein.

With respect to step 404 of FIG. 4, illustrating the calculation of respective poses of the industrial vehicle from each analyzed associated feature pair, FIGS. 9-11*b* provide further detail relating to this step 404. For example, with a pair of associated features, a global pose of an industrial vehicle may be calculated. A first associated feature pair may be assumed to be a correct association between a UV-space feature pair and a global feature pair. As shown in FIG. 9, a circular path may exist around a global feature point that includes all possible positions for an industrial vehicle to match the UV-space observation.

Should an industrial vehicle travel around the circular path shown in FIG. 9, the associated camera would observe a second global feature point tracing a circular path around a first global feature point 1002*a*. When both of the global feature points are at a substantially same height, the path shown will be a circle 1004*a* as shown in plot 1000*a* of FIG. 10*a*. When the global feature points are at different heights, the path 1004*b* will be more distorted and less circular around point 1002*b*, as shown in plot 1000*b* of FIG. 10*b*. P1 may be a first global feature point that is assumed to be correctly positioned, and P2 may be a path around P1 for a predicted second global feature point of an associated feature pair.

Figure 10A:
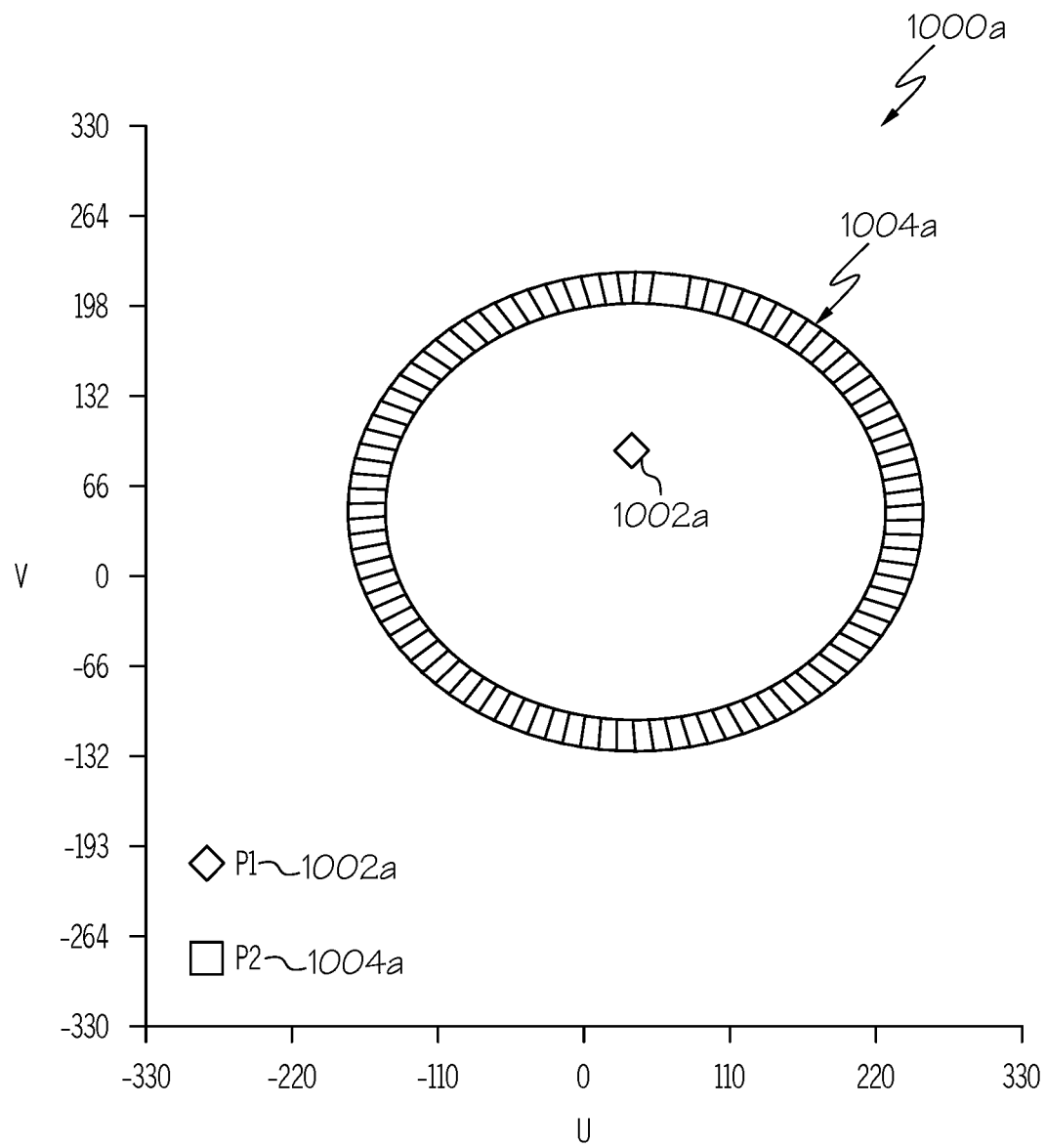
FIG. 10a depicts an exemplary plot of a pair of global features where the second global feature of the pair traces a circular path around the first global feature and both the features are at substantially the same height according to one or more embodiments shown and described herein.
Figure 10B:
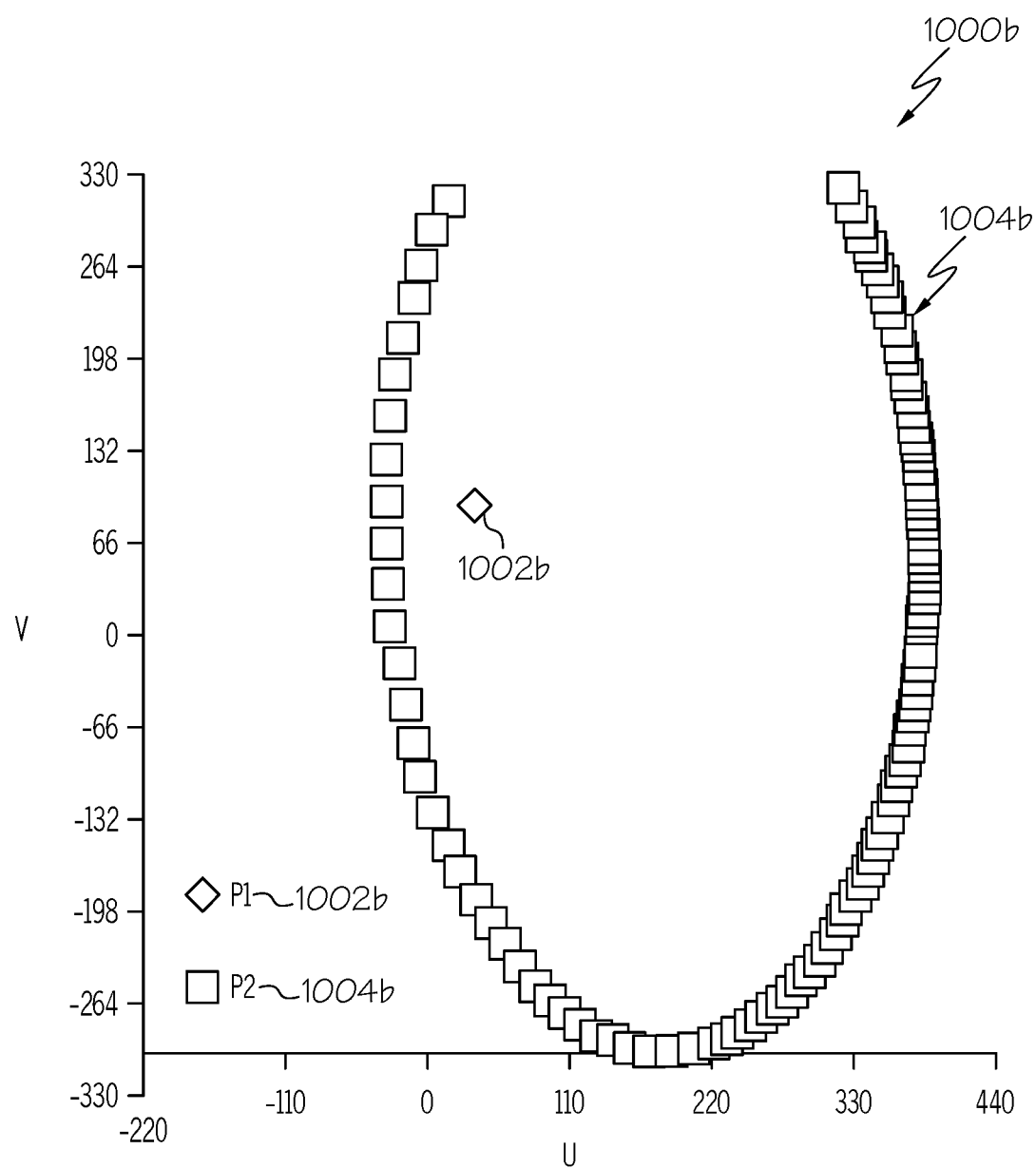
FIG. 10b depicts an exemplary plot of a pair of global features where the second global feature of the pair traces a distorted path around the first global feature and the features are at different heights according to one or more embodiments shown and described herein.
Figure 11A:
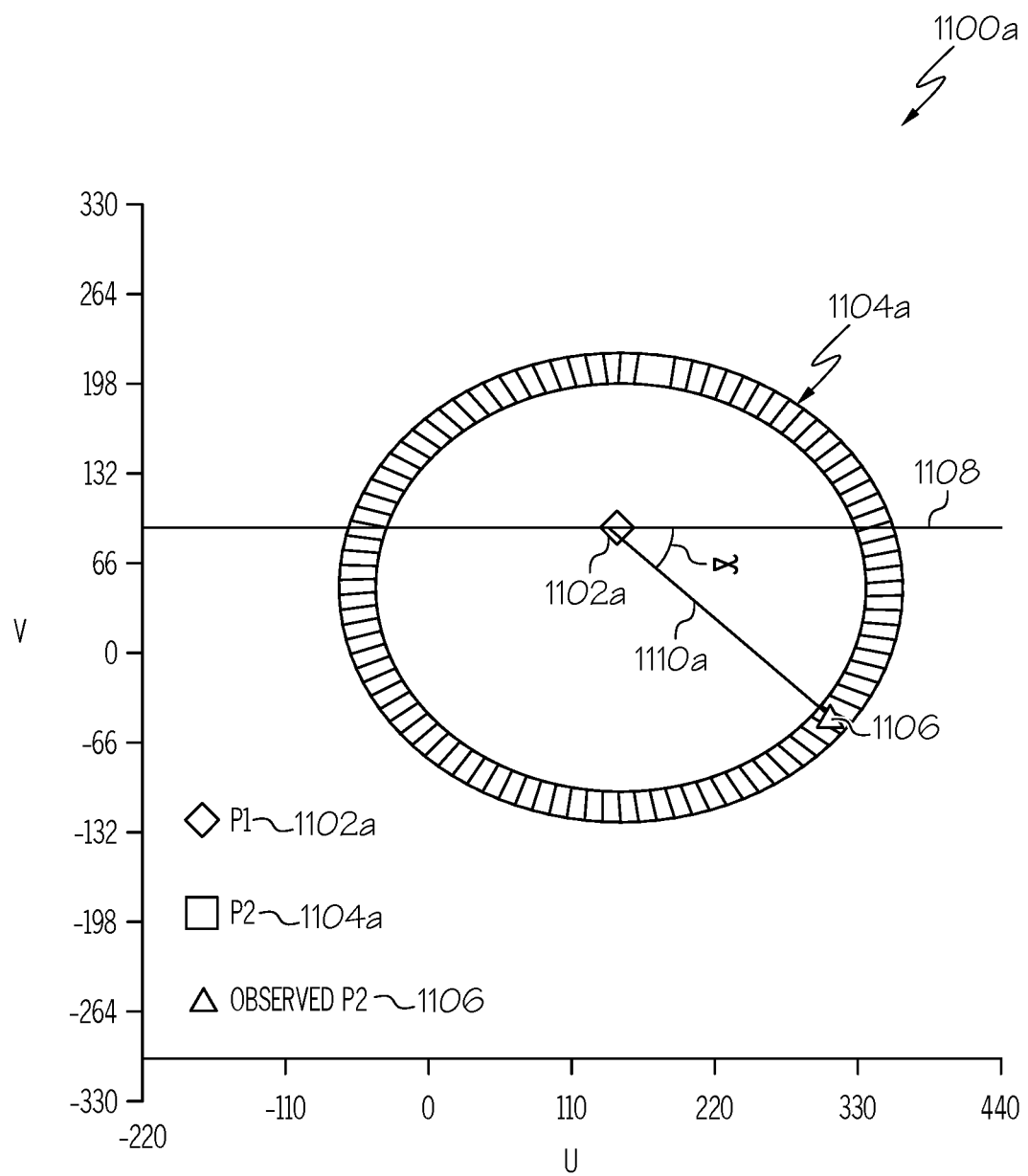
FIG. 11a depicts the exemplary plot of FIG. 10a showing valid associated features and showing the second global feature's observed UV-space point plotted along with the heading of the vehicle that is an angle of the line between the first global feature point and the plotted observed second global feature point according to one or more embodiments shown and described herein.

Referring to plot 1100*a* of FIG. 11*a*, the second global feature point's predicted UV-space path P2 as plotted as path 1104*a* around P1 point 1102*a* on FIG. 10*a* is additionally shown with an observed or actual P2 UV-space point 1106 along with a line 1110*a* showing the heading or direction of the industrial vehicle. For example, an angle α of the line between P1 and the observed P2 point represents the heading of the industrial vehicle with respect to a horizontal line 1108 intersecting point P1 on the UV-space plot. With the heading of the industrial vehicle known, an exact location of the industrial vehicle on or within the circular path of FIG. 9 may be calculated.

Figure 11B:
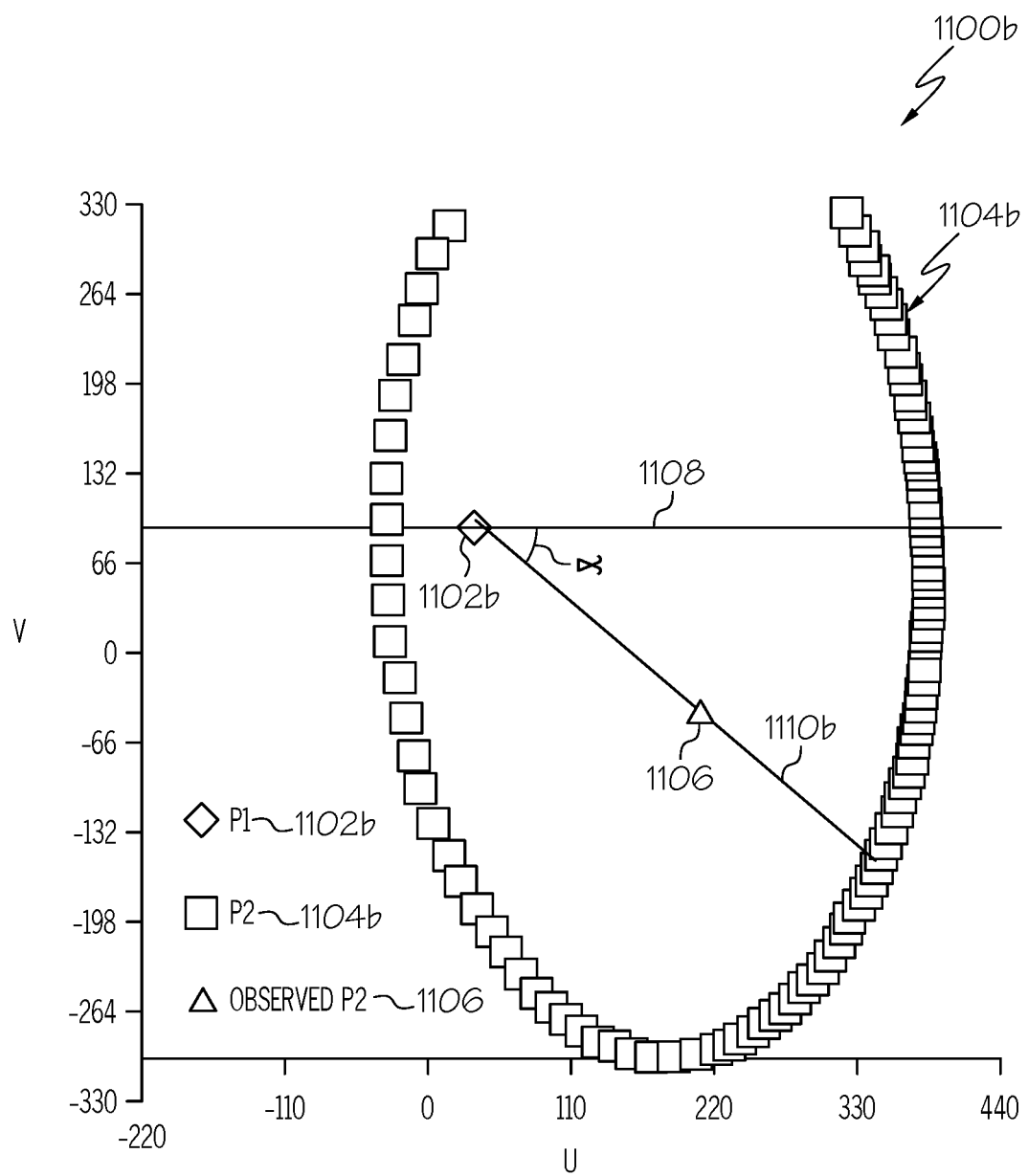
FIG. 11b depicts the exemplary plot of FIG. 10b showing invalid associated features and showing the second global feature's observed UV-space point plotted along with the heading of the vehicle that is an angle of the line between the first global feature point and the plotted observed second global feature point according to one or more embodiments shown and described herein.

Referring to plot 1100*b* of FIG. 11*b*, an invalid associated feature pair is shown. For example, the yaw or angle α of heading with respect to line 1108 is still the same as shown in FIG. 11*a*. However, the predicted value of P2 along path 1104*b* (as shown about P1 point 1102*b*) is different from the observed P2 point 1106 along line 1110*b*. This error is caught and reflected in the algorithm described below with request to the filtration and rating of step 406.

In embodiments, in implementation, an algorithm similar yet more analytical than the heuristic algorithm described above may be employed to make the same calculations of pose or potential poses of an industrial vehicle. For example, two vectors are created in a global space that extend from an observing camera to intersect with their respective UV-space feature points. If an industrial vehicle (on which the camera is positioned) is located anywhere on the path shown in FIG. 9, the first vector passes through the first global feature point.

Equation 3, below, sets forth an algorithm that would then be used to calculate a yaw of the industrial vehicle utilizing a similar analysis as that shown in and described above with respect to FIGS. 11*a*-11*b*. The pitch, roll, and height of the industrial vehicle must be known, and a yaw rotation about an anchored feature (e.g., the first UV-space feature point of the pair) is calculated so that the second vector intersects the second global feature point.

Let $N$ be a cross product of two 3$D$ vectors;     EQUATION 3
Let $T$ be a target 3$D$ point for yaw rotation;

$$D = \sqrt{N_x^2 * N_y^2};$$

$$Y_{offset} = 2 * \tan^{-1}\left(\frac{N_x}{\sqrt{N_x^2 + N_y^2} + N_y}\right); \text{ and}$$

$$Y = \begin{cases} \text{undefined, if } N_z \neq 0, \text{ and } \left|\frac{T_z}{\sqrt{T_x^2 + T_y^2}}\right| > \left|\frac{D}{N_z}\right|, \\ \quad \text{and } D*T_x - N_z*T_z = 0 \\ -Y_{offset}, \text{ if } \left\|\frac{T_x}{T_y}\right| - \left|\frac{N_z}{D}\right\| < 0.001 \text{ and } T_y > 0 \\ \pi - Y_{offset}, \text{ if } \left\|\frac{T_x}{T_y}\right| - \left|\frac{N_z}{D}\right\| < 0.001 \text{ and } T_y < 0 \\ 2*\tan^{-1}\left(\frac{\frac{D*T_y}{D*T_x - N_z*T_z} -}{\frac{\sqrt{D^2*(T_x^2 * T_y^2) - N_z^2 * T_z^2}}{D*T_x - N_z*T_z}}\right) - Y_{offset}, \\ \quad \text{otherwise} \end{cases}$$

The calculated yaw of the industrial vehicle is then used to calculate the x and y position of the industrial vehicle within the circular path shown in FIG. 9, for example. If the formula is undefined and/or when a resulting pose would cause the second global feature to be outside the visual range of the observing camera, the associated feature pair is assumed to be invalid and, as further explained below, may be given a low rating and/or filtered out from potential current location poses.

The algorithm set forth in Equation 3 is executed for each associated feature pair to analyze and calculate a respective pose of the industrial vehicle. For example, referring to Equation 2, if there are 180 associated feature pair to analyze, the algorithm of Equation 3 will be executed 180 times to find 180 respective calculated potential poses for the industrial vehicle.

Figure 12A:
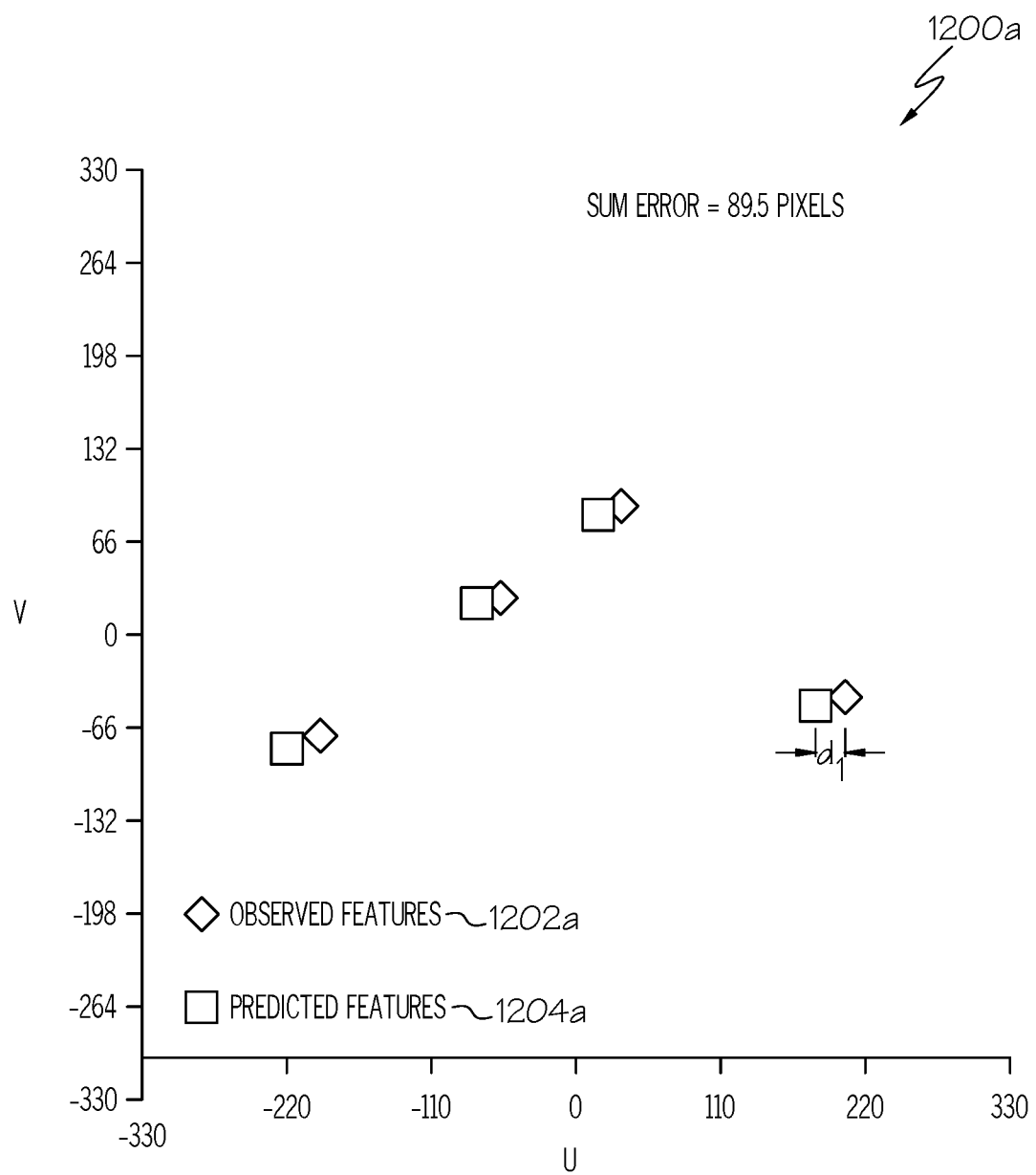
FIG. 12a depicts an exemplary plot of a first set of image space error calculations between observed and predicted global features in UV space and their associated sum errors shown as pixel differences according to one or more embodiments shown and described herein.
Figure 12B:
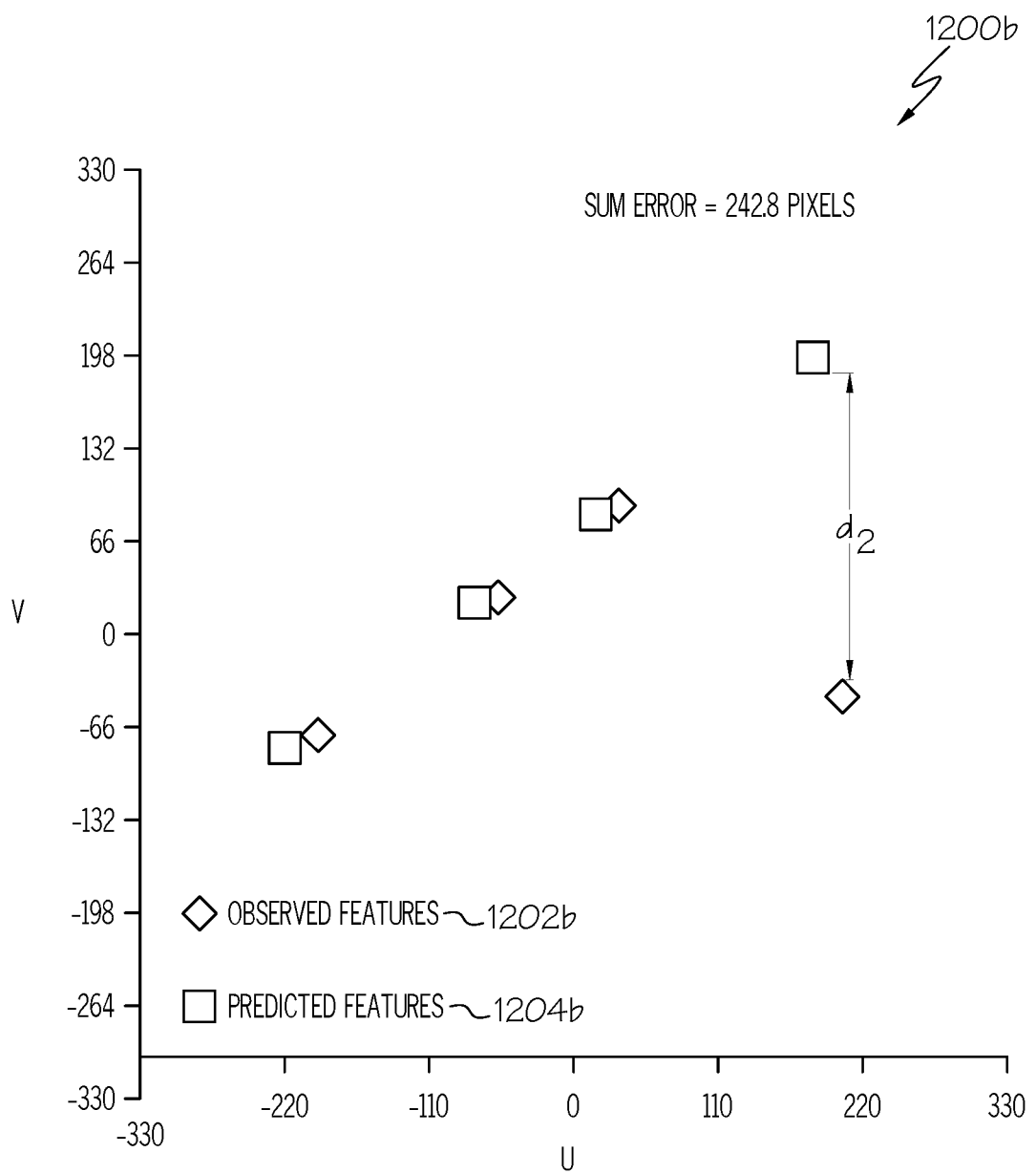
FIG. 12b depicts an exemplary plot of a second set of image space error calculations between observed and predicted global features in UV space and their associated sum errors shown as pixel differences according to one or more embodiments shown and described herein.

With respect to steps 406, 408, and 410 of FIG. 4, illustrating the filtration and rating of calculated poses of the industrial vehicle until a single pose remains for selection as the current industrial vehicle global location, FIGS. 12*a*-12*b* provide further detail relating to these steps. For example, the result of the algorithm of Equation 3 is a predicted pose for an industrial vehicle for each associate feature pair for which the algorithm is executed. Due to the method of generation of the associated feature pairs as described above with respect to step 402, most of the associated feature pairs will be incorrectly matched having a predicted global feature that is not the observed global feature. This will result in an incorrect pose or position and orientation of the industrial vehicle. For example, Table 1 below shows a sample listing of a portion of a number of associated feature pairs undergoing a filtering process.

UV-space feature, and pixel distances (such as $d_1$ and $d_2$ of FIGS. 12*a* and 12*b*, respectively) between all the respective expected and observed features are calculated and recorded as a sum error value. For example, FIG. 12*a* shows a sum error of 89.5 pixels and FIG. 12*b* shows a sum error of 242.8 pixels. Additional error is added for each observed UV-space feature that is expected to be an obscured view to correctly favor poses of the industrial vehicle with unobscured views while allowing for the possibility of viewing featuring through racking systems and the like.

TABLE 1

Associated Features in a Filtering Process

| | | | Truck Pose | | | |
|---|---|---|---|---|---|---|
| Observed Pairs | Global Pairs | P2 Pixel Error | X | Y | Yaw | Pose Sum Error |
| A-D | 3-6 | 0.000035 | 22.033089 | 31.075258 | −2.216561 | 0.000094 |
| B-D | 6-2 | 0.000071 | 22.033091 | 31.075256 | −2.216562 | 0.000309 |
| A-B | 3-2 | 0.000071 | 22.033089 | 31.075260 | −2.216561 | 0.000355 |
| A-B | 2-3 | 0.000266 | 12.273301 | 28.401800 | 0.929074 | 527.704407 |
| A-C | 1-3 | 0.001384 | 22.033062 | 31.075277 | −2.216557 | 0.002831 |
| B-C | 1-2 | 0.001489 | 22.033159 | 31.075203 | −2.216573 | 0.007578 |
| A-C | 3-1 | 0.260840 | 12.259998 | 25.138067 | 0.923709 | 797.660278 |
| A-C | 10-12 | 0.596078 | 32.753166 | 37.953327 | −2.214491 | 791.942505 |
| A-C | 12-10 | 0.745620 | 23.006958 | 31.977741 | 0.927837 | 831.249451 |
| B-C | 2-1 | 0.927803 | 12.217776 | 21.671368 | 0.917981 | 781.692993 |
| B-D | 9-6 | 1.397965 | 22.305523 | 30.640556 | −1.170767 | 568.430054 |
| B-C | 4-3 | 1.593932 | 12.211194 | 28.466362 | 0.908872 | 527.163879 |
| A-D | 7-3 | 1.596871 | 23.076479 | 33.215626 | 2.710362 | 1743.258301 |
| A-D | 6-3 | 1.614486 | 17.506252 | 25.292450 | 0.907588 | 445.587128 |
| C-D | 12-7 | 1.758447 | 23.150492 | 31.870743 | 0.950136 | 3622.848633 |
| C-D | 8-6 | 2.003298 | 23.295267 | 18.367418 | 0.974085 | 468.817841 |
| B-D | 7-4 | 2.174680 | 16.417931 | 40.468800 | −1.067948 | 851.924622 |
| B-D | 2-6 | 2.188290 | 17.295401 | 21.818115 | 0.879420 | 820.643311 |
| A-C | 4-2 | 2.372573 | 12.277193 | 28.414560 | 0.919361 | 527.704407 |
| B-C | 3-4 | 3.095659 | 22.074608 | 37.850021 | −2.221126 | 560.148987 |
| A-D | 7-10 | 3.400297 | 27.586580 | 37.696659 | −2.231963 | 540.068359 |
| A-D | 3-7 | 3.634117 | 16.418772 | 36.340736 | −0.407071 | 527.551514 |
| B-D | 6-9 | 3.866897 | | | | |
| A-C | 9-11 | 3.948898 | 32.762928 | 34.245033 | −2.223162 | 803.063477 |
| C-D | 5-7 | 4.104186 | 21.446938 | 44.672523 | −2.119775 | 470.918762 |
| A-C | 11-9 | 4.818144 | 22.987978 | 28.287266 | 0.922818 | 488.460419 |
| B-D | 4-7 | 5.148854 | | | | |
| C-D | 6-1 | 5.953378 | | | | |
| B-D | 7-11 | 6.164304 | | | | |
| B-C | 4-5 | 6.732026 | | | | |
| A-B | 9-10 | 6.902301 | | | | |

In embodiments, a first round of filtering is executed at the end of each calculation of an potential pose for an associated feature pair made in step 404. For example, after a potential pose of an industrial vehicle from an associated feature pair is calculated, the validity of the second associated feature (e.g., the second global feature point) is tested. The second global feature point 1204*a* or 1204*b* is projected as a predicted point onto the UV-space plot and compared to its observed UV-space counterpart 1202*a* or 1204*b*, as shown in plots 1200*a* or 1200*b* of FIGS. 12*a*-12*b*. If a distance between the predicted and observed second global feature points is larger than a maximum noise of the system, the respective and compared calculated potential pose of the industrial vehicle is filtered out as invalid.

The remaining calculated potential poses of the industrial vehicle match a respective pair of UV-space features used to generate each calculated pose and will not consider any of the other observed features. As shown in FIGS. 12*a*-12*b*, expected UV-space features at each pose of an industrial vehicle are calculated using a map of 3D global features of the industrial facility or warehouse. Observed UV-space features are matched to their nearest expected or predicted Calculated poses of the industrial vehicle that result in having a sum error that is higher than the sum of the maximum observation noise are filtered out. The remaining poses are sorted in a descending order based on sum error to rate and rank the poses. Each observed pair of step 402 may thus be associated correctly to result in an identical pose. In implementation, due to camera and feature extraction errors and limitations of the algorithm of Equation 3, however, not all of the resulting associated feature pairs may result in an accurate pose.

In embodiments, distinct truck poses with a lowest sum error from the poses that were not filtered out are selected as possible current locations of the industrial vehicle while using an interpose distance threshold to remove duplicate poses of the industrial vehicle. For example, with respect to Table 1 above, the first listed pose is selected as the possible current pose of the industrial vehicle as it has the lowest sum error of all of the other listed poses. The rest of the remaining poses that are within a location tolerance and a heading tolerance of the first selected pose may be considered as duplicates and removed from the list of possible poses of the industrial vehicle. For example, if any of the remaining positions of the industrial vehicle on Table 1 are within 1.5 meters and within 1 degree of the first selected pose location, those remaining positions would be considered as duplicates and will not be included in a final list of possible poses or positions of the industrial vehicle after filtration and rating is applied as described herein.

Figure 13:
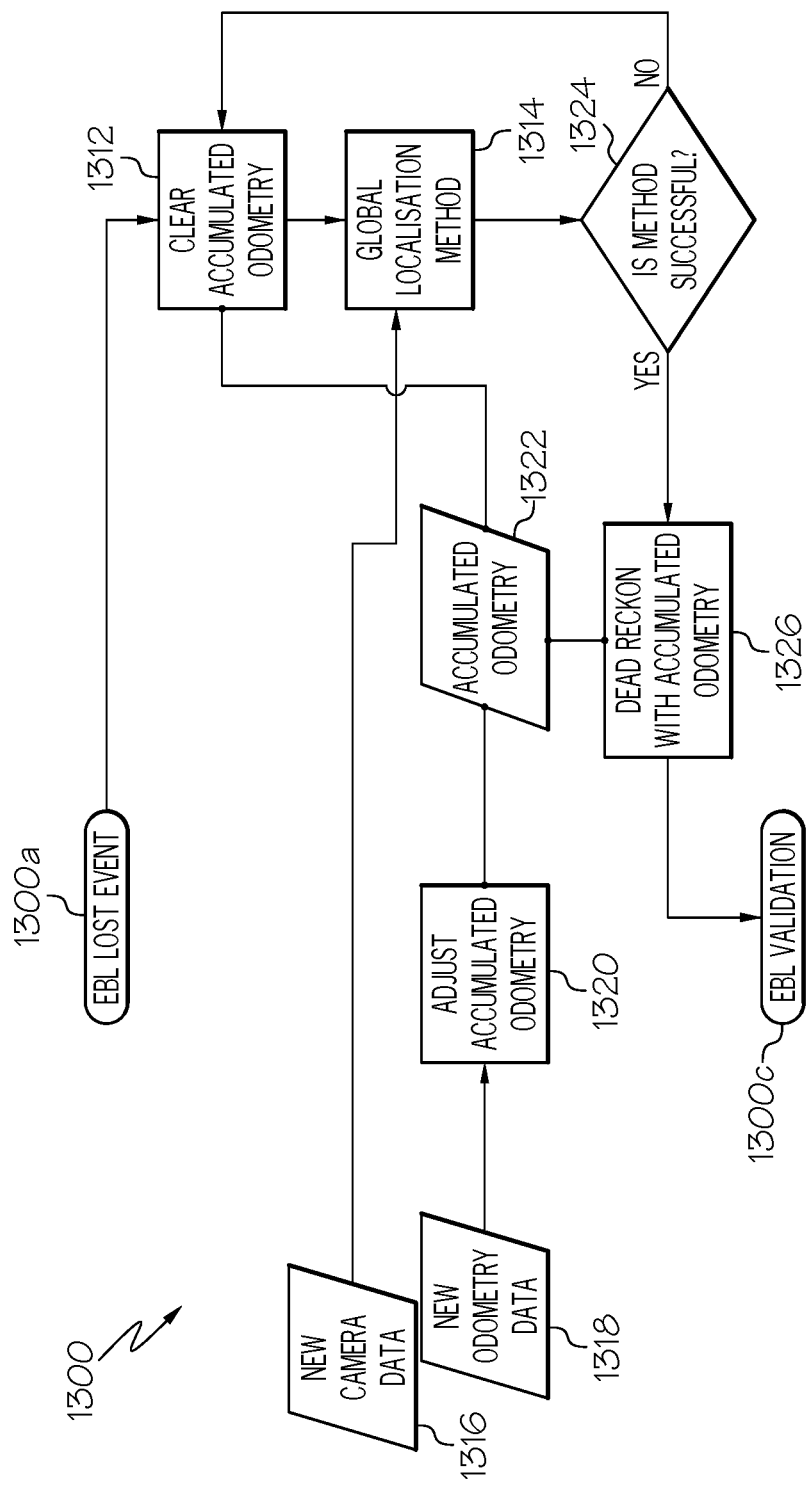
FIG. 13 depicts a flowchart overview of an exemplary accumulated odometry program flow method according to one or more embodiments shown and described herein.

Referring to FIG. 13, an accumulated odometry program flow or system 1300 is shown that accounts for the fact that while the above described GLM is running as shown in FIG. 4, the industrial vehicle may still be moving. In a large industrial facility site, or warehouse, that includes many possible features (both global and in UV-space), the GLM may take a certain amount of time, such as less than a minute to up to a few minutes, to analyze each selected and/or possible associated feature pair as described above. The odometry accumulation system of FIG. 13 may keep track of a distance traveled by the industrial vehicle during this time between the starting position of the GLM and the current position of the industrial vehicle.

Referring to FIG. 13, once a localization system lost event 1300a occurs, accumulated odometry is cleared in step 1312. GLM is applied in step 1314 via new camera data 1316. If the GLM of step 1314 is determined to not be successful in step 1324, the process repeats from step 1312. New odometry data 1318 is used to adjust accumulated odometry in step 1320 and calculate a current accumulated odometry in step 1322. If the GLM of step 1314 is determined to be successful in step 1324, the accumulated odometry of step 1322 is combined with the GLM results from steps 1314 and 1324 and dead reckoned in step 1326. The results of step 1326 are then sent to be validated through a localization system validation process step 1300c as described above with respect to the validation process 300c of FIG. 3, for example, and as described further below with respect to flow 1400 of FIG. 14.

In embodiments, the GLM runs as a separate thread in the localization system. While the algorithm of the GLM runs and is executed, as described with respect to FIG. 4, for example, a main localization system thread may begin to dead reckon from a (0,0) point with a 0 degree heading, such that it runs from an origin point. When the GLM is successful, the new, current dead reckoned position from the origin point reflects an accumulated odometry that will be transposed onto a known start position or rather, a current pose as calculated by the GLM, of the industrial vehicle. If the GLM fails, the dead reckoning on the main localization system thread will zero out the accumulated odometry before processing begins or is retried on another new (or newest) camera frame.

Figure 14:
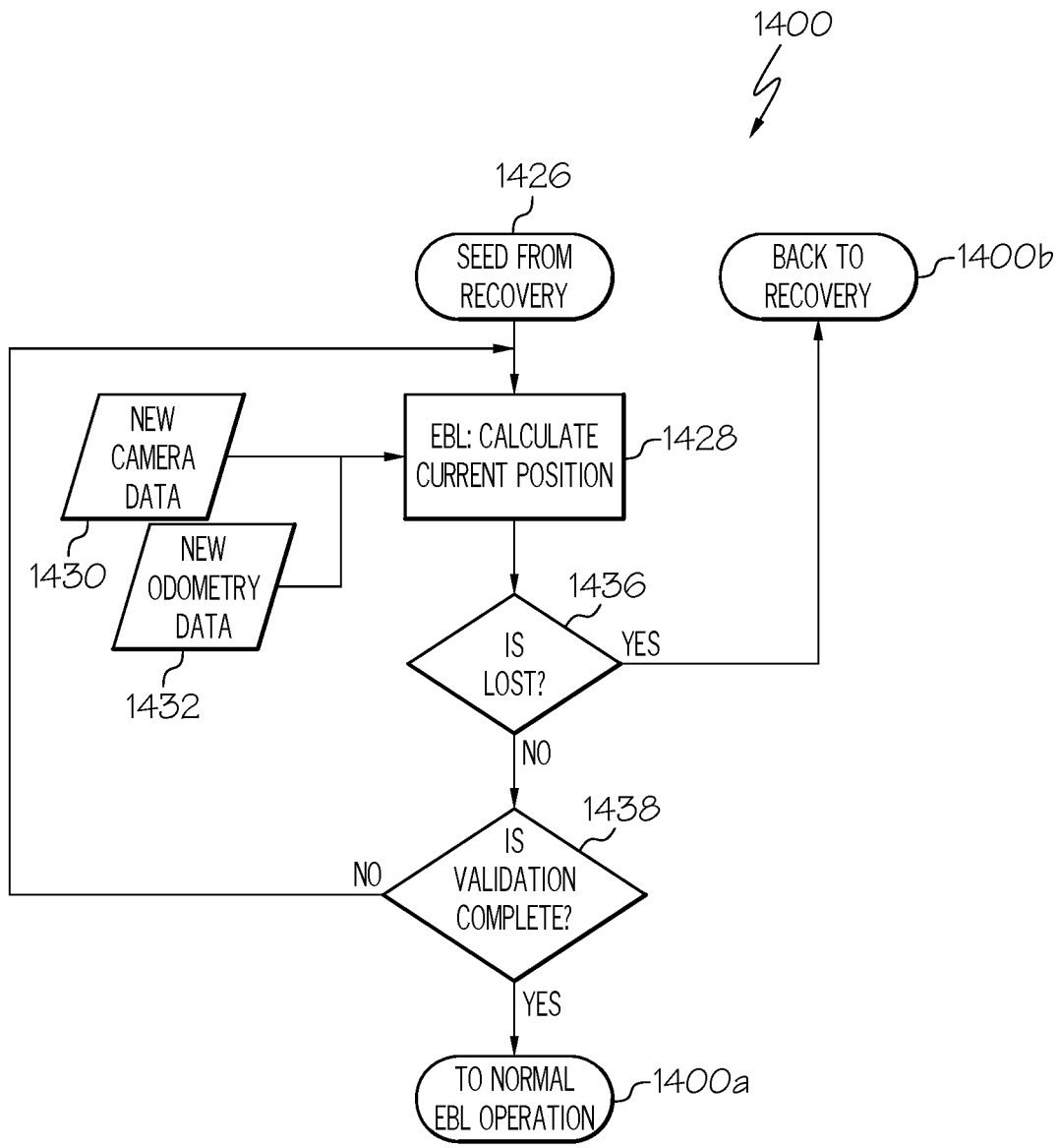
FIG. 14 depicts a flowchart overview of an exemplary localization system validation program flow method according to one or more embodiments shown and described herein.

Referring to FIG. 14, a localization system validation program flow 1400 is shown and may be provided to confirm an accuracy and correctness of the pose of the industrial vehicle as calculated by the GLM before publishing the pose and continuing normal operations on the localization system. Thus, a check is made to ensure the localization system is in a healthy and accurate operation before an operator is notified of the pose of the industrial vehicle. Through validation, the localization system is seeded (or rather, re-seeded) in step 1426 with the pose from the GLM but does not report or publish a current position. In step 1428 of FIG. 14, a number of unique global features are matched and recorded. Once this number of unique global features exceeds a threshold, the localization system exits the validation state in step 1438 and begins to publish location data. It should be understood that the particular threshold selected for the number of unique global features may depend on a variety of operational requirements associated with the industrial vehicle and the industrial facility in which the industrial vehicle is used. For example, it may be preferable to equate the threshold to a number of ceiling lights in a typical aisle of an industrial facility such as a warehouse. Alternatively or additionally, the threshold value may be established, at least in part, through trial and error while monitoring an effectiveness of the validation state.

For a seed or GLM calculated current pose of an industrial vehicle that is incorrect, the step 1428 of FIG. 14 should be unable to match new global features as a match rate drops to zero, such that the localization system becomes lost in step 1436 (to return back to a recovery flow in step 1400b) and/or validation fails in step 1438. Should validation fail in step 1438, the localization system will attempt to receive a new seed in step 1426 via the GLM through use of a new set of camera data 1430 until a correct seed is analyzed to provide a calculated current localization system position in step 1428 and, if not lost in step 1436, validated to result in a completed validation in step 1438 and a return to a normal localization system operation in step 1400a.

It should now be understood that embodiments of the GLM algorithm described herein can be utilized to extract features from objects captured in input images of a ceiling. Thus, objects that can be detected on the ceiling such as, for example, ceiling lights can be utilized to produce features that can be reported to the localization system. The localization system can utilize the reported features from the input image for determining the pose of the vehicle, position of the vehicle, or both. For example, the reported features can include centerlines and point features that can be utilized in conjunction. Accordingly, the pose and position of the vehicle can be utilized as a parameter for navigation, simultaneous localization and mapping (SLAM), or the like.

In embodiments, the GLM may be a recovery thread or mechanism operating alongside a localization system. In other embodiments, the GLM may be a standalone localization algorithm for a vehicle positioning or navigation system to provide a more reliable method of localization for certain environmental conditions in place of and/or over conventional localization system. In embodiments, the algorithm of the GLM may be run in parallel with a localization system to serve as a validation mechanism to validate a localization system position and to meet higher safety standards. It should be understood that the one or more GLM algorithms described herein may be used in conjunction with a variety of other vehicle positioning and/or navigation systems, including but not limited to RFID-based localization systems. Further, the one or more GLM algorithms described herein may be used to assist in controlling specific functions of an industrial vehicle such as, for example, a lift height and/or speed of an industrial vehicle such as a lift truck. It should be understood that the one or more algorithms of the GLM described herein may also be utilized as a diagnostic tool for a variety of vehicle positioning and/or navigation systems.

Thus, the localization system and/or GLM can be utilized to provide features for navigation of the vehicle or can be presented by a display communicatively coupled to the localization system and/or GLM. It is noted that there are a number of parameters (e.g. thresholds) that can be configured for each function of the GLM algorithm according to the particular site that is being navigated by the vehicle. Accordingly, the embodiments described herein can further include a calibration stage for determining the precise values for the parameters.

It is also noted that recitations herein of "at least one" component, element, etc., should not be used to create an inference that the alternative use of the articles "a" or "an" should be limited to a single component, element, etc. For example, recitation of "a drive mechanism" is not limited to a single drive mechanism and contemplates the use of multiple independent or integrated drive mechanisms.

It is noted that one or more of the following claims utilize the terms "wherein," "based on," and "by" as transitional or introductory phrases. For the purposes of defining the present disclosure, it is noted that these terms are introduced in the claims as open-ended transitional or introductory phrases that are used to introduce an open-ended recitation of one or more claim limitations and should be interpreted in like manner as the more commonly used open-ended term "comprising." For example, calculations described herein based on set forth variables may be based on those variables at least in part. Additionally, numbered claim paragraphs herein do not imply specified order of steps.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

For the purposes of describing and defining the present disclosure it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A materials handling vehicle comprising a camera, one or more vehicular processors, a drive mechanism configured to move the materials handling vehicle along an inventory transit surface, a materials handling mechanism configured to store and retrieve goods in a storage bay of an industrial facility, and vehicle control architecture in communication with the drive and materials handling mechanisms, wherein:
the camera is communicatively coupled to the one or more vehicular processors and captures an input image of overhead features;
an industrial facility map comprises a plurality of three-dimensional global feature points associated with a mapping of the overhead features; and
the one or more vehicular processors of the materials handling vehicle execute vehicle functions to:
(i) create a plurality of associated feature pairs by retrieving a set of camera data from the camera comprising two-dimensional UV space information, forming pairs from the UV space information, and mapping pairs from the UV space information with pairs from the plurality of three-dimensional global feature points of the industrial facility map;
(ii) calculate respective vehicle poses for associated feature pairs within a visual range of the camera;
(iii) determine a smallest pose sum error by comparing a plurality of pose sum errors of the plurality of associated feature pairs;
(iv) calculate a best estimate pose of the materials handling vehicle based on a highest-ranked pair of the plurality of associated feature pairs, wherein the highest-ranked pair comprises the smallest pose sum error of the plurality of associated feature pairs; and
(v) navigate the materials handling vehicle utilizing the best estimate pose.

2. The materials handling vehicle of claim 1, wherein the plurality of associated feature pairs are created by data association steps comprising:
(i) creating UV space information pairs;
(ii) associating each global feature point with a first UV space feature in each UV space information pair; and
(iii) associating each global feature point within a maximum visual range of the camera with a second UV space feature in each UV space information pair.

3. The materials handling vehicle of claim 1, wherein the calculation of a vehicle pose for each associated feature pair within a visual range of the camera is based at least in part on use of a global localization algorithm, wherein the global localization algorithm comprises a formula to calculate a yaw of the vehicle about a first UV space feature of an associated feature pair that comprises an anchored feature, wherein the formula comprises:

(i) $N$ is a cross product of two 3D vectors;

(ii) $T$ is a target 3D point for yaw rotation;

(iii) $D = \sqrt{N_x^2 * N_y^2}$ (iv) $Y_{offset} = 2 * \tan^{-1}\left(\dfrac{N_x}{\sqrt{N_x^2 + N_y^2} + N_y}\right)$; and (v) $Y = \begin{cases} \text{undefined, if } N_z \neq 0, \text{ and } \left|\dfrac{T_z}{\sqrt{T_x^2 + T_y^2}}\right| > \left|\dfrac{D}{N_z}\right|, \\ \quad \text{and } D * T_x - N_z * T_z = 0 \\ -Y_{offset}, \text{ if } \left\|\dfrac{T_x}{T_y}\right| - \left|\dfrac{N_z}{D}\right\| < 0.001 \text{ and } T_y > 0 \\ \pi - Y_{offset}, \text{ if } \left\|\dfrac{T_x}{T_y}\right| - \left|\dfrac{N_z}{D}\right\| < 0.001 \text{ and } T_y < 0 \\ 2 * \tan^{-1}\left(\dfrac{\dfrac{D * T_y}{D * T_x - N_z * T_z} - }{\sqrt{D^2 * (T_x^2 * T_y^2) - N_z^2 * T_z^2}}\right) - Y_{offset}, \\ \quad \text{otherwise} \end{cases}$ 4. The materials handling vehicle of claim 1, wherein the one or more vehicular processors further execute vehicle functions to:
  (i) use an accumulated odometry associated with the materials handling vehicle to update the best estimate pose to a current localized position;
  (ii) set a seed position as the current localized position;
  (iii) track the navigation of the materials handling vehicle along the inventory transit surface, navigate the materials handling vehicle along the inventory transit surface in at least a partially automated manner, or both, utilizing the current localized position.

5. The materials handling vehicle of claim 4, wherein the one or more vehicle processors further execute vehicle functions to validate the current localized position prior to updating the seed position as the current localized position, such validation comprising functions to:
  (i) record the number of unique global feature points after each data association step until the number is above a threshold such that the seed position as the current localized position is validated.

6. The materials handling vehicle of claim 4, wherein the one or more vehicular processors further execute vehicle functions to publish the seed position as the current localized position on a display after updating the seed position as the current localized position.

7. The materials handling vehicle of claim 1, wherein the one or more vehicular processors further executes vehicle functions to:
  (i) determine when the materials handling vehicle is lost;
  (ii) when the materials handling vehicle is determined to be lost, retrieve a subsequent set of camera data from the camera and repeat functions (i)-(iv) of claim 1 with the subsequent set of camera data from the camera in place of the set of camera data from the camera until the materials handling vehicle is found.

8. The materials handling vehicle of claim 7, wherein determine when the materials handling vehicle is lost comprises determine when the materials handling vehicle is lost based on at least one of:
  (i) whether a seed position comprises incorrect data; and
  (ii) whether the camera data is insufficient to correct for an error associated with an accumulated odometry associated with the materials handling vehicle.

9. A system comprising a materials handling vehicle and a management server, wherein:
  the materials handling vehicle comprises a camera, one or more vehicular processors, a drive mechanism configured to move the materials handling vehicle along an inventory transit surface, a materials handling mechanism configured to store and retrieve goods in a storage hay of an industrial facility, and vehicle control architecture in communication with the drive and materials handling mechanisms;
  the camera is communicatively coupled to the one or more vehicular processors and the management server and captures an input image of overhead features;
  the one or more vehicular processors are communicatively coupled to the management server;
  an industrial facility map stored on the management server is communicatively coupled to the one or more vehicular processors, wherein the industrial facility map comprises a plurality of three-dimensional global feature points associated with a mapping of the overhead features; and
  the one or more vehicular processors of the materials handling vehicle executes vehicle functions to:
    (i) create a plurality of associated feature pairs by retrieving a set of camera data from the camera comprising two-dimensional UV space information, forming pairs from the UV space information, and mapping pairs from the UV space information with pairs from the plurality of three-dimensional global feature points of the industrial facility map;
    (ii) calculate respective vehicle poses for associated feature pairs within a visual range of the camera;
    (iii) determine a smallest pose sum error by comparing a plurality of pose sum errors of the plurality of associated feature pairs;
    (iv) calculate a best estimate pose of the materials handling vehicle from the calculated vehicle poses based on a highest-ranked pair of the plurality of associated feature pairs, wherein the highest-ranked pair comprises the smallest pose sum error of the plurality of associated feature pairs; and
    (v) navigate the materials handling vehicle utilizing the best estimate pose.

10. The system of claim 9, wherein the plurality of associated feature pairs are created by data association steps comprising:
  (i) creating UV space information pairs;
  (ii) associating each global feature point with a first UV space feature in each UV space information pair; and
  (iii) associating each global feature point within a maximum visual range of the camera with a second UV space feature in each UV space information pair.

11. The system of claim 9, wherein the one or more vehicular processors further execute vehicle functions to:
  (i) use an accumulated odometry associated with the materials handling vehicle to update the best estimate pose to a current localized position;
  (ii) set a seed position as the current localized position;
  (iii) publish the seed position as the current localized position on a display; and
  (iv) track the navigation of the materials handling vehicle along the inventory transit surface, navigate the materials handling vehicle along the inventory transit surface in at least a partially automated manner, or both, utilizing the current localized position.

12. The system of claim 11; wherein the one or more vehicular processors further execute vehicle functions to validate the current localized position prior to updating the seed position as the current localized position, such validation comprising functions to:
  (i) record the number of unique global feature points after each data association step until the number is above a threshold such that the seed position as the current localized position is validated.

13. The system of claim 9, wherein the one or more vehicular processors further execute vehicle functions to:
  (i) determine when the materials handling vehicle is lost; and
  (ii) when the materials handling vehicle is determined to be lost, retrieve a subsequent set of camera data from the camera and repeat functions (i)-(iv) of claim 9 with the subsequent set of camera data from the camera in place of the set of camera data from the camera until the materials handling vehicle is found.

14. The system of claim 13, wherein the determination of whether the materials handling vehicle is lost is based on at least one of:
  (i) whether the seed position comprises incorrect data; and
  (ii) whether the camera data is insufficient to correct for an error associated with the accumulated odometry.

15. A method of navigating or tracking a navigation of a materials handling vehicle along an inventory transit surface, the method comprising:
- disposing a materials handling vehicle upon an inventory transit surface of an industrial facility, wherein the materials handling vehicle is in communication with a management server, wherein the materials handling vehicle comprises a camera, one or more vehicular processors, a drive mechanism configured to move the materials handling vehicle along the inventory transit surface, a materials handling mechanism configured to store and retrieve goods in a storage bay of the industrial facility, and vehicle control architecture in communication with the drive and materials handling mechanisms;
- utilizing the drive mechanism to move the materials handling vehicle along the inventory transit surface;
- capturing an input image of overhead features of the industrial facility via the camera as the materials handling vehicle moves along the inventory transit surface;
- providing an industrial facility map comprising a plurality of three-dimensional global feature points associated with a mapping of the overhead features;
- creating a plurality of associated feature pairs by retrieving a set of camera data from the camera comprising two-dimensional UV space information, forming pairs from the UV space information, and mapping pairs from the UV space information with pairs from the plurality of three-dimensional global feature points of the industrial facility map;
- via the one or more vehicular processors, calculating respective vehicle poses for associated feature pairs within a visual range of the camera;
- via the one or more vehicular processors, determining a smallest pose sum error by comparing a plurality of pose sum errors of the plurality of associated feature pairs;
- via the one or more vehicular processors, calculating a best estimate pose of the materials handling vehicle from the calculated vehicle poses based on a highest-ranked pair of the plurality of associated feature pairs, wherein the highest-ranked pair comprises the smallest pose sum error of the plurality of associated feature pairs; and
- navigating the materials handling vehicle along the inventory transit surface utilizing the best estimate pose.

16. The method of claim 15, wherein the plurality of associated feature pairs are created by data association steps comprising:
- creating UV space information pairs;
- associating each global feature point with a first UV space feature in each UV space information pair; and
- associating each global feature point within a maximum visual range of the camera with a second UV space feature in each UV space information pair.

17. The method of claim 15, further comprising:
- using an accumulated odometry associated with the materials handling vehicle to update the best estimate pose to a current localized position;
- setting a seed position as the current localized position;
- publishing the seed position as the current localized position on a display; and
- via the one or more vehicular processors and the management server, tracking the navigation of the materials handling vehicle along the inventory transit surface, navigating the materials handling vehicle along the inventory transit surface in at least a partially automated manner, or both, utilizing the current localized position.

18. The method of claim 17, further comprising:
- validating the current localized position prior to updating the seed position as the current localized position, such validation comprising:
    - recording the number of unique global feature points after each data association step until the number is above a threshold such that the seed position as the current localized position is validated.

19. The method of claim 15 the method further comprising:
- determining whether the materials handling vehicle is lost;
- when the materials handling vehicle is determined to be lost, finding the materials handling vehicle by retrieving a subsequent set of camera data from the camera comprising two-dimensional UV space information, forming pairs from the UV space information, and mapping each pair from the UV space information with pairs from each of the plurality of three-dimensional global feature points of the industrial facility map to create a plurality of new associated feature pairs;
- via the one or more vehicular processors, calculating a respective vehicle pose for each new associated feature pair within a visual range of the camera;
- via the one or more vehicular processors, calculating a new best estimate pose of the materials handling vehicle from the calculated vehicle poses based on a highest-ranked pair of the plurality of new associated feature pairs;
- using an accumulated odometry associated with the materials handling vehicle to update the new best estimate pose to a new current localized position; and
- setting the seed position as the new current localized position.

20. The method of claim 19, wherein the determination of whether the materials handling vehicle is lost is based on at least one of:
- (i) whether the seed position comprises incorrect data; and
- (ii) whether the camera data is insufficient to correct for an error associated with the accumulated odometry.

* * * * *